US008332908B2

(12) United States Patent
Hatakeyama et al.

(10) Patent No.: US 8,332,908 B2
(45) Date of Patent: Dec. 11, 2012

(54) SHARING MANAGEMENT SYSTEM, SHARING MANAGEMENT METHOD AND PROGRAM

(75) Inventors: Makoto Hatakeyama, Tokyo (JP); Hidehito Gomi, Tokyo (JP); Shigeru Hosono, Tokyo (JP)

(73) Assignee: NEC Corporation, Tokyo (JP)

( * ) Notice: Subject to any disclaimer, the term of this patent is extended or adjusted under 35 U.S.C. 154(b) by 866 days.

(21) Appl. No.: 12/305,992

(22) PCT Filed: Jun. 12, 2007

(86) PCT No.: PCT/JP2007/061812
§ 371 (c)(1),
(2), (4) Date: Dec. 22, 2008

(87) PCT Pub. No.: WO2007/148562

PCT Pub. Date: Dec. 27, 2007

(65) Prior Publication Data

US 2009/0276825 A1 Nov. 5, 2009

(30) Foreign Application Priority Data

Jun. 22, 2006 (JP) .................................. 2006-172254

(51) Int. Cl.
*G06F 21/00* (2006.01)
(52) U.S. Cl. .......................................................... 726/1
(58) Field of Classification Search ........................ None
See application file for complete search history.

(56) References Cited

U.S. PATENT DOCUMENTS

| 6,633,915 | B1 * | 10/2003 | Hashimoto .................... 709/228 |
| 6,766,946 | B2 * | 7/2004 | Iida et al. ........................ 235/381 |
| 6,845,448 | B1 * | 1/2005 | Chaganti et al. .............. 713/166 |
| 6,942,143 | B1 * | 9/2005 | Iida et al. ........................ 235/379 |
| 7,032,819 | B2 * | 4/2006 | Iida et al. ........................ 235/381 |
| 7,092,944 | B2 * | 8/2006 | Fukuta et al. ........................ 1/1 |
| 7,269,853 | B1 * | 9/2007 | Dunn .............................. 726/27 |
| 7,497,381 | B2 * | 3/2009 | Iida ............................... 235/462.14 |
| 7,590,705 | B2 * | 9/2009 | Mathew et al. ................ 709/217 |
| 7,788,328 | B2 * | 8/2010 | Ramanathan et al. ......... 709/206 |
| 7,917,468 | B2 * | 3/2011 | Ariel et al. ..................... 707/610 |
| 2002/0104015 | A1 * | 8/2002 | Barzilai et al. ................ 713/201 |
| 2002/0188609 | A1 * | 12/2002 | Fukuta et al. .................... 707/10 |
| 2003/0028493 | A1 * | 2/2003 | Tajima et al. .................... 705/67 |
| 2003/0047602 | A1 * | 3/2003 | Iida et al. ........................ 235/382 |

(Continued)

FOREIGN PATENT DOCUMENTS

| JP | 2002-269092 | 9/2002 |
| JP | 2003-110605 | 4/2003 |
| JP | 2004-005583 | 1/2004 |
| JP | 2004-303243 | 10/2004 |
| JP | 2004-328578 | 11/2004 |
| JP | 2005-222552 | 8/2005 |
| JP | 2006-344156 | 12/2006 |

*Primary Examiner* — Oscar Louie
(74) *Attorney, Agent, or Firm* — Young & Thompson

(57) ABSTRACT

In a policy-change input unit (10), a policy recalculation unit (133) compares, upon occurring of a change request of a privacy policy from a user, an existing policy against an updating policy, recalculates a transmission policy to be transmitted to other providers based on the result of comparison, and transmits the recalculated policy to the other policy. The policy recalculation unit (133) transmits a deletion request of personal information to another provider by using a deletion-request creation unit, upon judging that the another provider cannot use the personal information due to the change of privacy policy.

12 Claims, 15 Drawing Sheets

U.S. PATENT DOCUMENTS

| | | | |
|---|---|---|---|
| 2003/0069874 A1* | 4/2003 | Hertzog et al. | 707/1 |
| 2004/0139315 A1* | 7/2004 | Tokutani et al. | 713/156 |
| 2005/0001025 A1* | 1/2005 | Ilda et al. | 235/381 |
| 2005/0039003 A1 | 2/2005 | Wray | |
| 2005/0193093 A1* | 9/2005 | Mathew et al. | 709/219 |
| 2006/0071067 A1* | 4/2006 | Iida | 235/382 |
| 2006/0294024 A1* | 12/2006 | Hatakeyama et al. | 705/75 |
| 2007/0027917 A1* | 2/2007 | Ariel et al. | 707/104.1 |
| 2007/0106733 A1* | 5/2007 | Ramanathan et al. | 709/206 |
| 2010/0100732 A1* | 4/2010 | Hatakeyama et al. | 713/161 |

* cited by examiner

FIG. 3(A)

PRIVACY POLICY CONCLUDED BETWEEN
USER AND TELEPHONE COMPANY

| INFORMATION | ACCESS RIGHT | INTENDED USE | MANAGEMENT SCHEME | REDISTRIBUTION CONDITION |
|---|---|---|---|---|
| TELEPHONE NUMBER | USER : rxw MANAGER : rx- | USER MANAGEMENT, PROVISION OF SERVICE, MARKETING, ADVERTISEMENT | PERMANENT USE | TELEPHONE COMPANY, BANK, ELECTRIC POWER COMPANY |
| * * * | * * * | * * * | * * * | * * * |

FIG. 3(B)

PRIVACY POLICY EXCHANGED BETWEEN
TELEPHONE COMPANY AND BANK

| INFORMATION | ACCESS RIGHT | INTENDED USE | MANAGEMENT SCHEME |
|---|---|---|---|
| TELEPHONE NUMBER | USER : rxw MANAGER : rx- | USER MANAGEMENT | PERMANENT USE |
| * * * | * * * | * * * | * * * |

FIG. 3(C)

PRIVACY POLICY EXCHANGED BETWEEN TELEPHONE
COMPANY AND ELECTRIC POWER COMPANY

| INFORMATION | ACCESS RIGHT | INTENDED USE | MANAGEMENT SCHEME |
|---|---|---|---|
| TELEPHONE NUMBER | USER : rxw MANAGER : rx- | MARKETING | PERMANENT USE |
| * * * | * * * | * * * | * * * |

FIG. 3(D)

PRIVACY POLICY UPDATED BY USER

| INFORMATION | ACCESS RIGHT | INTENDED USE | MANAGEMENT SCHEME | REDISTRIBUTION CONDITION |
|---|---|---|---|---|
| TELEPHONE NUMBER | USER : rxw MANAGER : rx- | USER MANAGEMENT, PROVISION OF SERVICE | PERMANENT USE | TELEPHONE COMPANY, BANK, ELECTRIC POWER COMPANY |
| * * * | * * * | * * * | * * * | * * * |

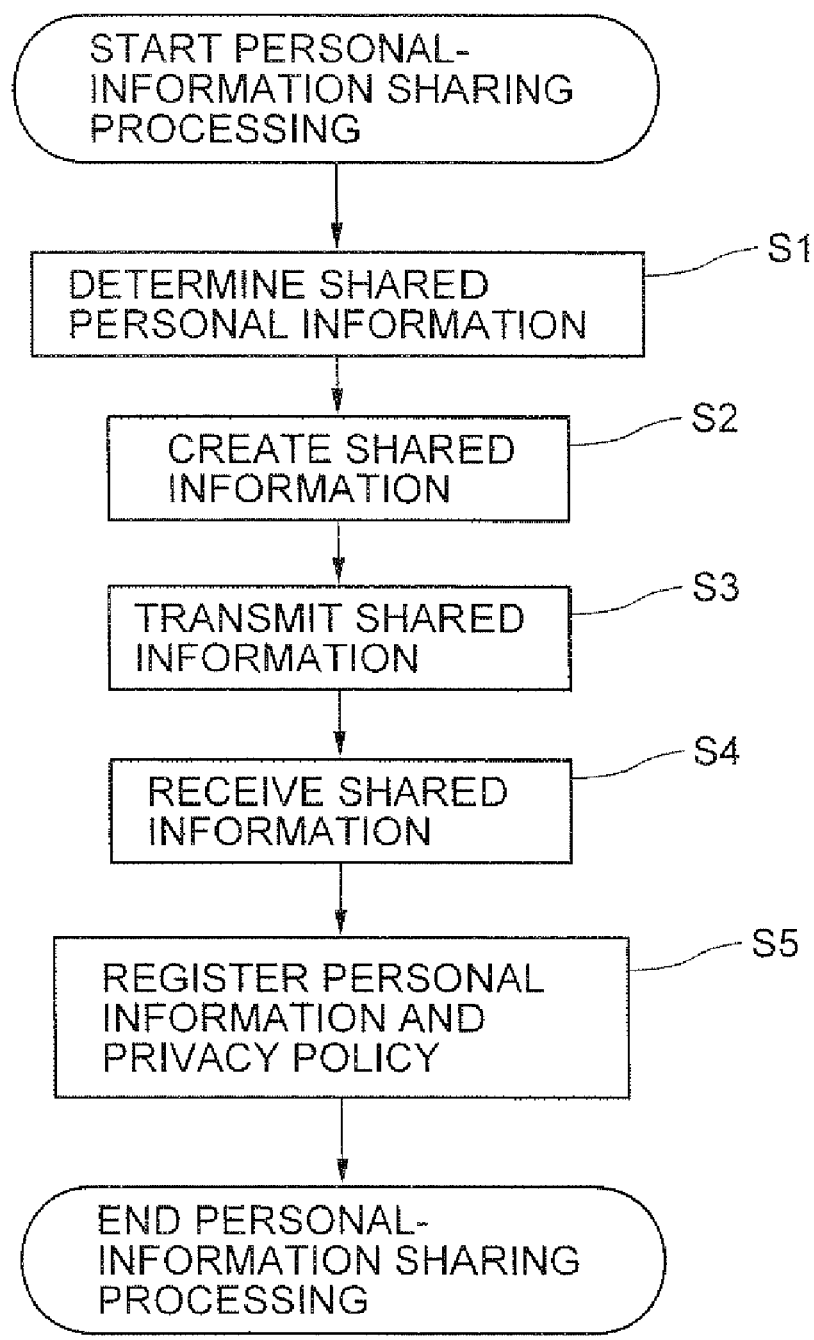

FIG. 9(A)
PRIVACY POLICY EXCHANGED BETWEEN TELEPHONE COMPANY AND ONE-STOP PROVIDER

| INFORMATION | ACCESS RIGHT | INTENDED USE | MANAGEMENT SCHEME | REDISTRIBUTION CONDITION |
|---|---|---|---|---|
| TELEPHONE NUMBER | USER : rxw MANAGER : rx- | USER MANAGEMENT, PROVISION OF SERVICE, MARKETING, ADVERTISEMENT | PERMANENT USE | TELEPHONE COMPANY, ONE-STOP SERVICE, BANK, ELECTRIC POWER COMPANY |
| * * * | * * * | * * * | * * * | * * * |

FIG. 9(B)
PRIVACY POLICY EXCHANGED BETWEEN ONE-STOP PROVIDER AND BANK

| INFORMATION | ACCESS RIGHT | INTENDED USE | MANAGEMENT SCHEME | REDISTRIBUTION CONDITION |
|---|---|---|---|---|
| TELEPHONE NUMBER | USER : rxw MANAGER : rx- | USER MANAGEMENT | PERMANENT USE | ONE-STOP SERVICE, BANK |
| * * * | * * * | * * * | * * * | * * * |

FIG. 9(C)
PRIVACY POLICY EXCHANGED BETWEEN ONE-STOP PROVIDER AND ELECTRIC POWER COMPANY

| INFORMATION | ACCESS RIGHT | INTENDED USE | MANAGEMENT SCHEME | REDISTRIBUTION CONDITION |
|---|---|---|---|---|
| TELEPHONE NUMBER | USER : rxw MANAGER : rx- | MARKETING | PERMANENT USE | ONE-STOP SERVICE, TELEPHONE COMPANY |
| * * * | * * * | * * * | * * * | * * * |

FIG. 9(D)
PRIVACY POLICY UPDATED BY USER

| INFORMATION | ACCESS RIGHT | INTENDED USE | MANAGEMENT SCHEME | REDISTRIBUTION CONDITION |
|---|---|---|---|---|
| TELEPHONE NUMBER | USER : rxw MANAGER : rx- | USER MANAGEMENT, PROVISION OF SERVICE | PERMANENT USE | TELEPHONE COMPANY, ONE-STOP SERVICE, BANK, ELECTRIC POWER COMPANY |
| * * * | * * * | * * * | * * * | * * * |

FIG. 9(E)
PRIVACY POLICY EXCHANGED BETWEEN TELEPHONE COMPANY AND ONE-STOP PROVIDER (AFTER USE CHANGED PRIVACY POLICY)

| INFORMATION | ACCESS RIGHT | INTENDED USE | MANAGEMENT SCHEME | REDISTRIBUTION CONDITION |
|---|---|---|---|---|
| TELEPHONE NUMBER | USER : rxw MANAGER : rx- | USER MANAGEMENT, PROVISION OF SERVICE | PERMANENT USE | TELEPHONE COMPANY, ONE-STOP SERVICE, BANK, ELECTRIC POWER COMPANY |
| * * * | * * * | * * * | * * * | * * * |

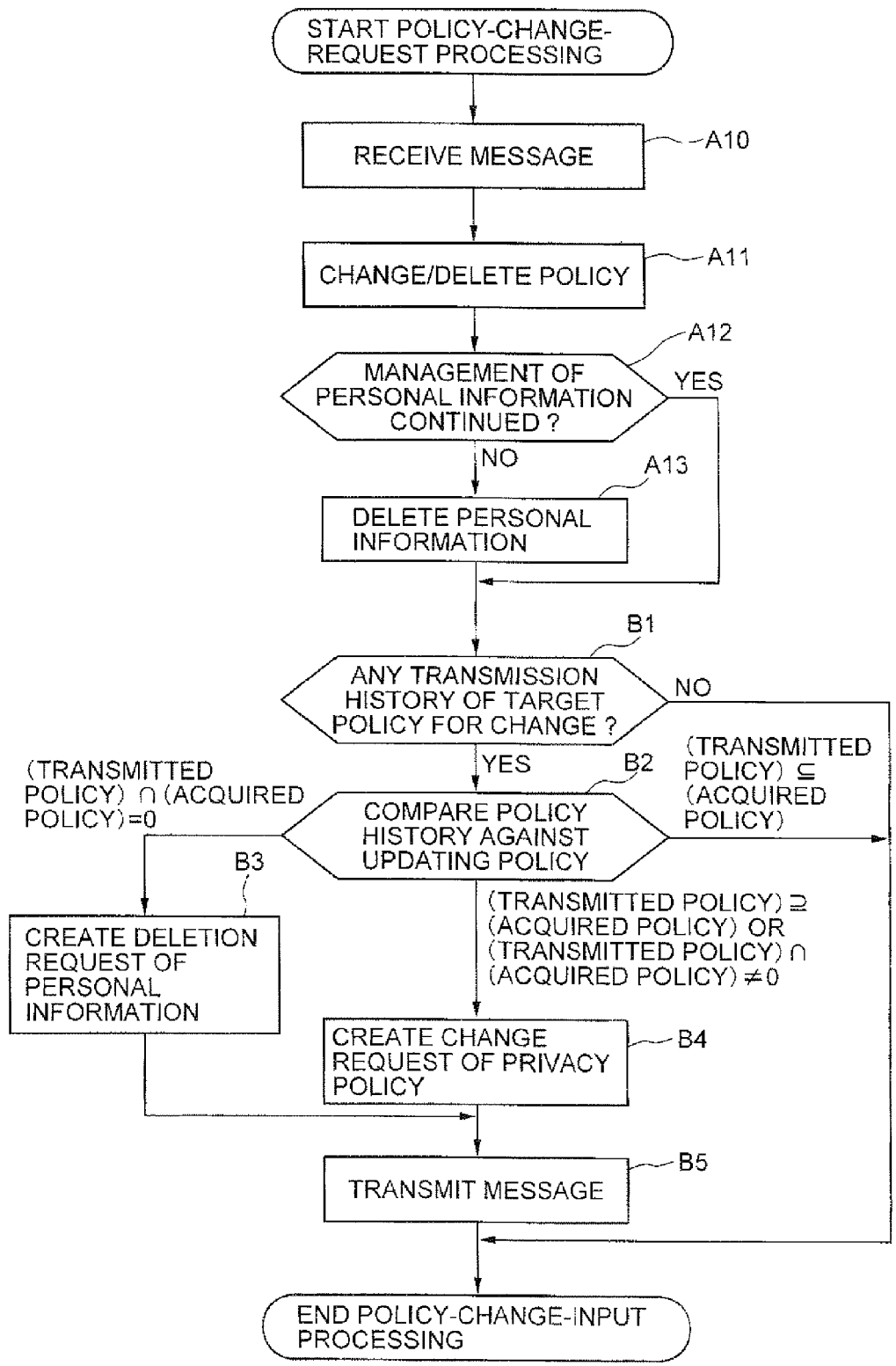

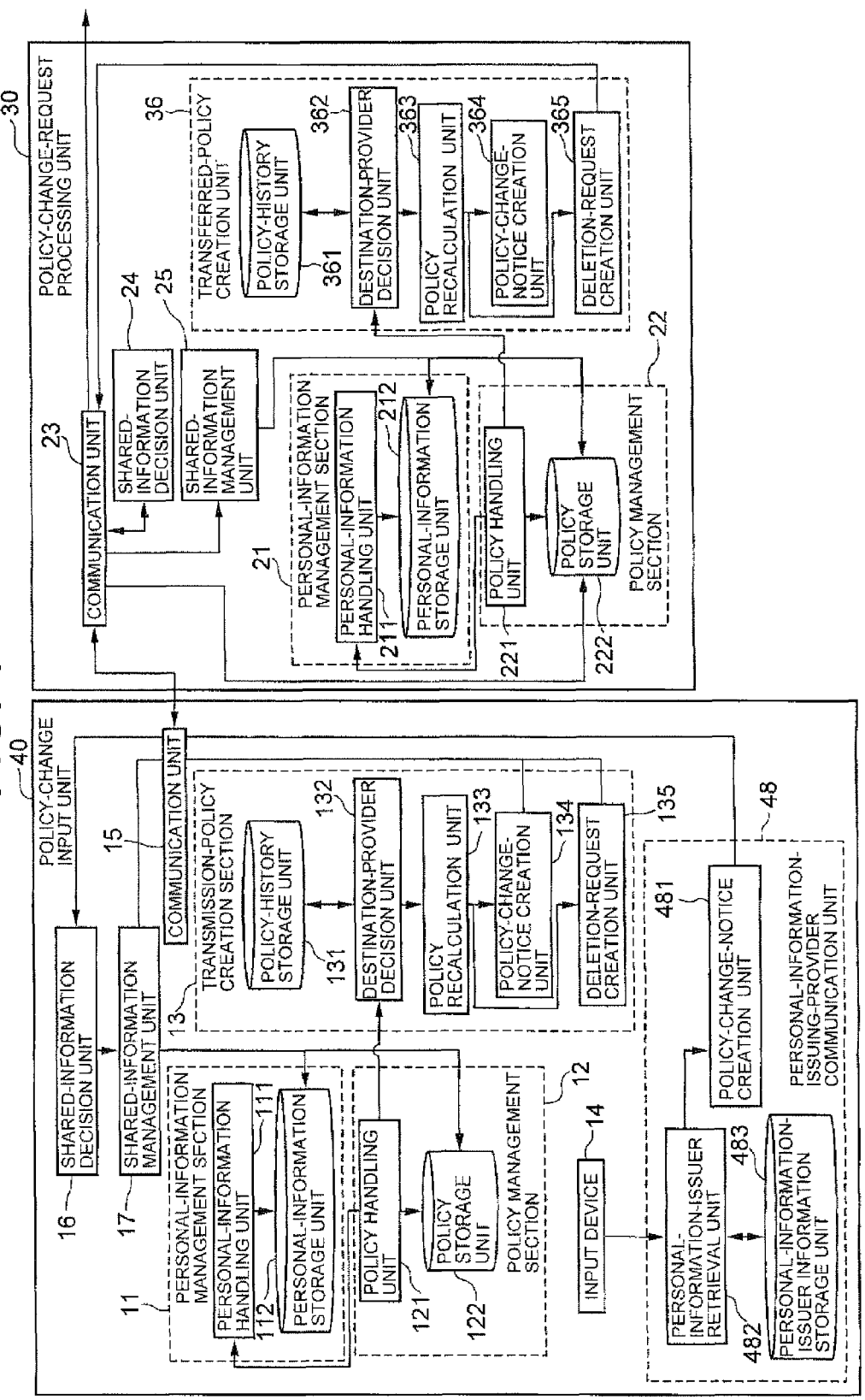

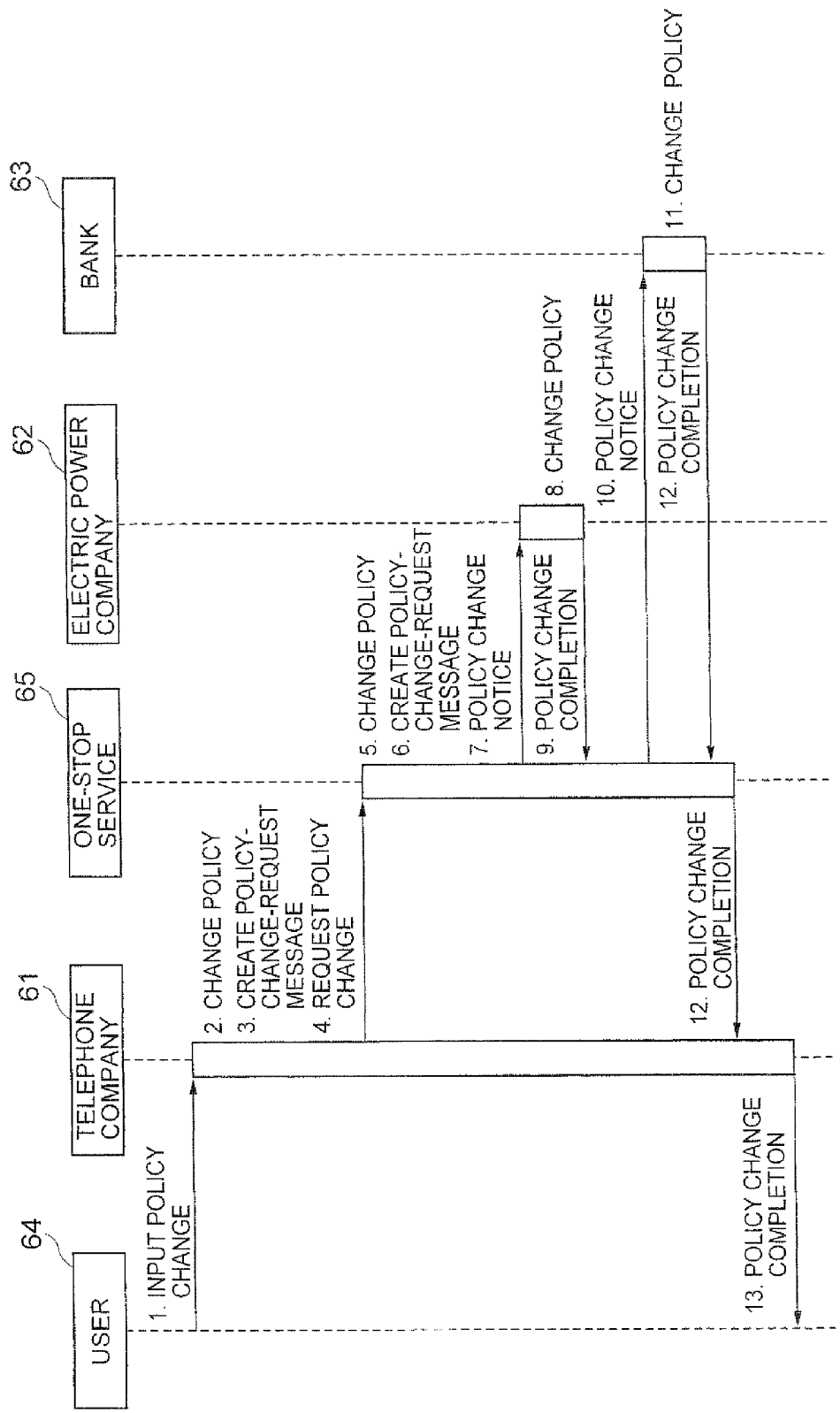

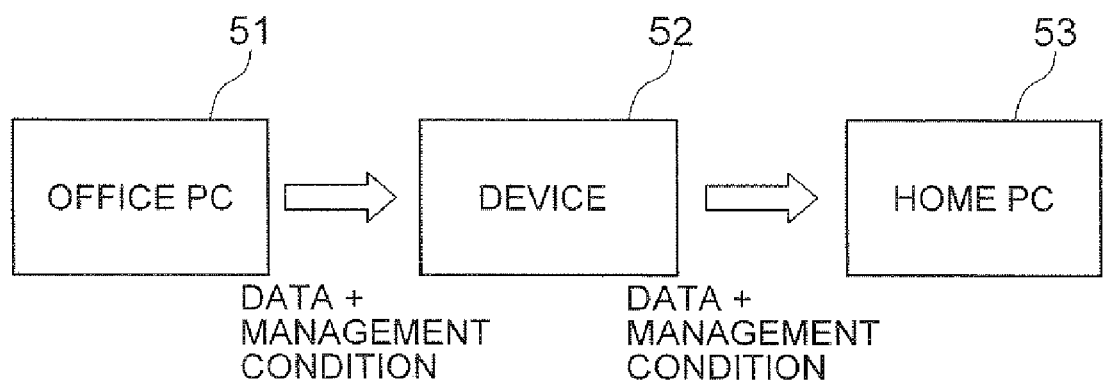

SHARING MANAGEMENT SYSTEM, SHARING MANAGEMENT METHOD AND PROGRAM

TECHNICAL FIELD

The present invention relates to a sharing management system in which a plurality of providers share and mage personal information, a sharing management method and a program and, more particularly, to the sharing management system, sharing management method and program that can control the lifecycle of the personal information.

BACKGROUND ART

An example of the conventional information sharing system is described in JP-2005-222552A. As shown in FIG. 15, the conventional information sharing system includes a plurality of units, among which data and management conditions thereof are transmitted and received.

The conventional information sharing system operates as follows. In order to share data between two of the units, for example, between an office PC 51 and a unit 52, or to synchronize data between these units, one of the units, for example, office PC 51 transmits the data and the management conditions thereof to unit 52. Unit 52 that received the data automatically transmits the received data further to a home PC 53. The user can set whether or not the user permits exchange of data automatically at this state between the units which transmit and receive data therebetween. Thus, the user can limit the range of data to be shared, to control the sharing of the data.

An example of a personal information management system is described in JP-2002-269092A. In the system described in this publication, an e-market provider registers in the database of the member management system the information (opening policy), which controls access to the information, for each information class of the member information, and determines the owner (e-market provider, ASP provider, ASP, ASP user) of the member information for the each information class. Each owner registers in the database of the member management system the information (opening rule) which controls access to the member information managed and owned by the each owner. Upon request of update or reference of the member information, permission or denial of the update or reference is judged with reference to the opening policy and opening rule.

Another example of the personal management system is described in JP-2004-5583A. In the system described in the publication, policy information that describes the handling criteria of user's personal information acquired from a client and preference information that defines contents of the personal information provided from the client to a server depending on the policy information are registered in association with each other. In order to assure that the policy information is not changed without a consent of the user, the server compares preference information and policy information at present against the preference information and policy information, respectively, that are registered.

Generally, a user provides user's personal information to a provider after the user consents to the privacy policy (handling policy of the personal information) that the provider offers. A plurality of providers respectively manage the user's personal information, and are allowed to provide the personal information to another provider so long as the user consents.

In this way, it is possible to transfer the personal information among the plurality of providers to share the personal information therebetween.

There may be a case where a user desires change of the privacy policy. For example, it is probable that a user stops the use of a service from a specific provider, and thus the user changes the purpose of use of the personal information in the privacy policy. In addition, a provider may change the privacy policy. For example, the provider may restrict use of the personal information in order to enhance the security.

The literatures as described above are silent to a technique that allows a change of the privacy policy to be reflected in all the providers that share thereamong the user's personal information. On the other hand, unless the change of the policy information is reflected in all the providers, handling of the personal information without the consent of the user may arise, which is improper from the view point of the protection of personal information. In addition, even if the change of privacy policy itself is reflected, it may occur that handling of the personal information is permitted outside the range of user's consent, unless the privacy policy thus changed is consistent with the privacy policy that is defined heretofore.

SUMMARY OF THE INVENTION

Thus, it is an object of the present invention to provide sharing management system, sharing management method and program that allow the providers that share the personal information thereamong to reflect a change of the privacy policy within the range of user's consent.

The present invention provides a sharing management system for sharing and managing personal information in a plurality of providers based on a policy specifying a condition with respect to handling of the personal information, wherein: the plurality of providers include respective management units that share and manage the personal information, the management units each including: personal-information-management unit that stores and manages the personal information; policy management unit that stores a policy corresponding to the personal information and changes contents of the policy in response to a change request of the policy with respect to specific personal information; and policy creation unit that judges whether or not it is needed to change a policy managed by another management unit, changes the policy managed by the another management unit if the change is needed, and transmits the changed policy to the another management unit.

The present invention also provides a sharing management system for sharing and managing personal information in a plurality of providers based on a policy specifying a condition with respect to handling of the personal information, including: plurality of management units that allow the plurality of providers to share and manage the personal information; and relay unit that relays data transmitted and received among the plurality of the management units, wherein the management units each comprise: personal-information-management unit that stores and manages the personal information; a policy management unit that stores a policy in accordance with the personal information and changes contents of the policy in response to a change request of the policy with respect to specific personal information, and wherein the relay unit comprises: a policy creation unit (36) that judges whether or not it is needed to change a policy managed by another management unit, changes the policy managed by the another management unit if the change is needed, and transmits the changed policy to the another management unit.

The present invention also provides a sharing management method for sharing and managing personal information in a plurality of providers based on a policy specifying a condition with respect to handling of the personal information, wherein a plurality of management units provided in respective providers for sharing and managing the personal information based on a control program executes: a personal-information-management step that stores the personal information in a memory unit and manages the same; a policy management step that stores a policy corresponding to the personal information in the memory unit, and changes contents of the policy in response to a policy change request with respect to specific personal information; and a policy creation step that judges, in response to the policy change request with respect to the specific personal information, whether or not it is needed to change a policy managed by another management unit, changes the policy managed by the another management unit if the change is judged, and transmits the changed policy to the another management unit.

The present invention also provides a sharing management method for sharing and managing personal information in a plurality of providers based on a policy specifying a condition with respect to handling of the personal information, wherein a plurality of management units provided in respective providers for sharing and managing the personal information based on a control program executes: a personal-information-management step that stores the personal information in a memory unit and manages the personal information; and a policy management step that stores a policy in accordance with the personal information in the memory unit, and changes contents of the policy in response to a change request of the policy with respect to specific personal information, and wherein a relay unit that relays data transmitted and received among the plurality of management unit the relay unit executes based on a control program: a policy creation step that judges whether or not it is needed to change a policy managed by another management unit, changes the policy managed by the another management unit if the change is needed, and transmits the changed policy to the another management unit.

The present invention also provides a program that operates a computer to share and manage personal information in a plurality of providers based on a policy specifying a condition with respect to handling of the personal information, wherein the program causes a plurality of management units provided in respective providers for sharing and managing the personal information to execute: a personal-information-management processing that stores the personal information in a memory unit and manages the same; a policy management processing that stores a policy corresponding to the personal information in the memory unit, and changes contents of the policy in response to a policy change request with respect to specific personal information; and a policy creation processing that judges, in response to the policy change request with respect to the specific personal information, whether or not it is needed to change a policy managed by another management unit, changes the policy managed by the another management unit if the change is judged, and transmits the changed policy to the another management unit.

The present invention also provides a program that operates a computer to share and manage personal information in a plurality of providers based on a policy specifying a condition with respect to handling of the personal information, wherein the program causes a relay unit that relays data transmitted and received in a plurality of management units provided in respective providers for sharing and managing the personal information to execute: a policy creation processing that judges, in response to a policy change request with respect to specific personal information from a specific one of the management units, whether or not it is needed to change a policy managed by another management unit, changes the policy managed by the another management unit if the change is needed, and transmits the changed policy to the another management unit.

The above and other objects, features and advantages of the present invention will be more apparent from the following description, referring to the accompanying drawings.

BRIEF DESCRIPTION OF THE DRAWINGS

FIG. 3 is an explanatory diagram showing an example of the privacy policy handled by the providers in the first exemplary embodiment of the present invention.

FIG. 4 is a flowchart showing the processing of sharing personal information in the first exemplary embodiment of the present invention.

FIG. 9 is an explanatory diagram showing an example of the privacy policy handled by the providers in the second exemplary embodiment of the present invention.

FIG. 10 is a flowchart showing a processing of the policy change request in the second exemplary embodiment of the present invention.

FIG. 11 is a block diagram showing the configuration of a sharing management system in a third exemplary embodiment of the present invention.

FIG. 14 is a sequential diagram showing the overall operation of the system of the present invention.

FIG. 15 is a block diagram showing a system wherein data object of the personal information is shared among conventional units.

BEST MODES OF CARRYING OUT THE INVENTION

Figure 1:
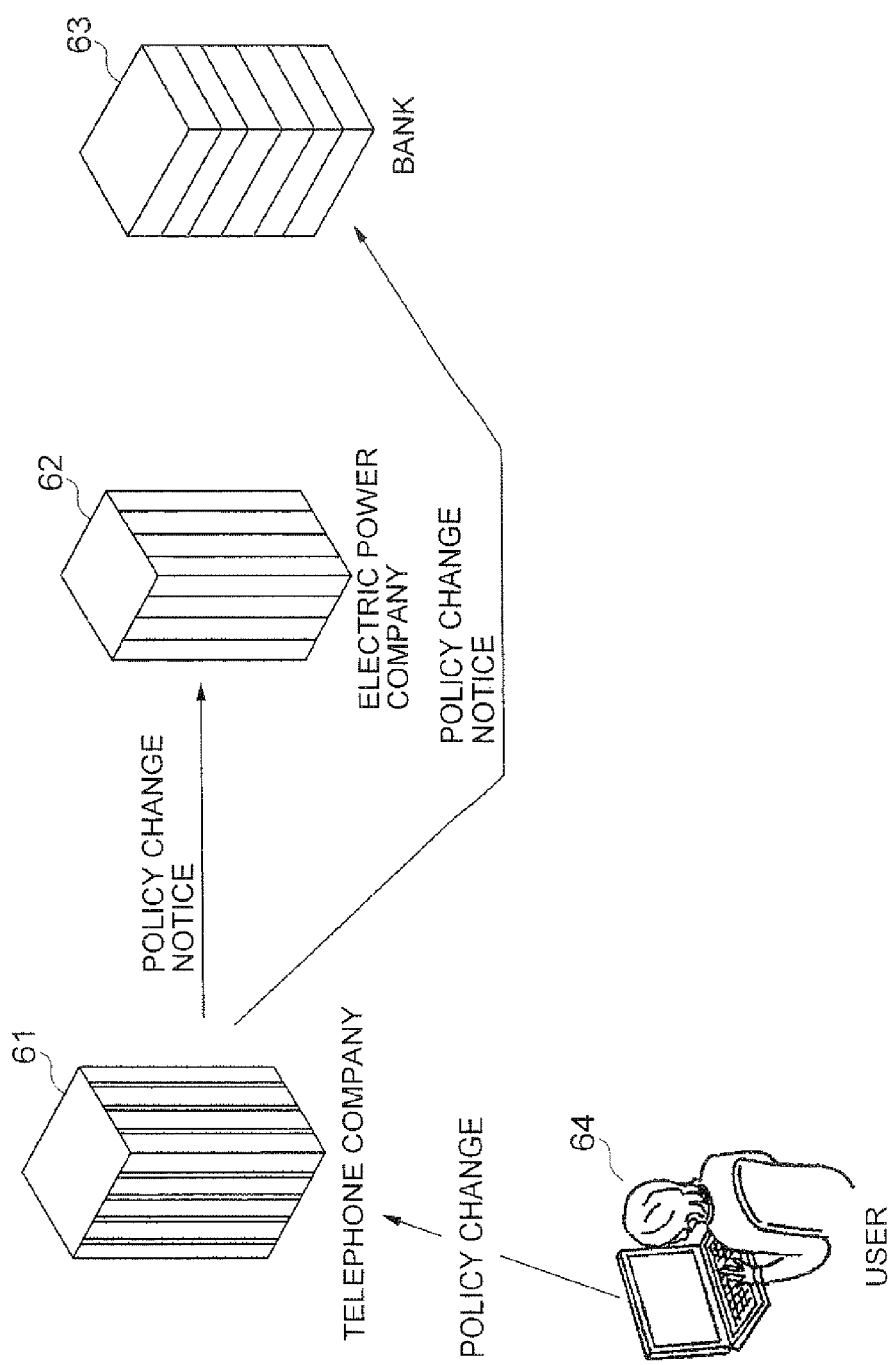
FIG. 1 is an explanatory diagram showing the relationship among providers in a first exemplary embodiment of the present invention.

Hereinafter, best modes for carrying out the present invention will be described in detail with reference to the drawing.

First Exemplary Embodiment

FIG. 1 is an explanatory diagram showing the relationship among providers in the first exemplary embodiment of the present invention. In the configuration shown in FIG. 1, telephone company 61, electric power company 62, and bank 63 correspond to providers. In this exemplary embodiment, "provider" means an organization (or company) that provides some sort of service to a user. Although examples of the provider include telephone company, electric power company and bank herein, providers are not limited to such providers, and any organization that provides a service to a user is referred to as provider in the present exemplary embodiment. For example, an Internet service provider (ISP) that provides a connection service to the Internet, or a manager of a Web site etc. may be referred to as the provider in the present exemplary embodiment. It is to be noted that since the present invention relates to a system that shares and manages personal information, the present invention is applied to a system of any providers that handle the personal information among the providers that provide a service.

Each provider acquires user's personal information from a user 64, or issues itself the personal information. Each provider 61, 62, 63 registers and manages the acquired personal information etc. of each user. When each provider acquires the personal information from a user, a privacy policy is concluded between the each provider 61, 62, 63 and the user 64. Here, "privacy policy" means the criterion, plan or rule defined is with respect to handling of the personal information.

Generally, a provider concludes the criterion, plan, etc. as to the handling of the personal information of each user, opens the same privacy policy, and a user that explicitly or implicitly agrees to the privacy policy provides the personal information to the provider. On the other hand, in the present exemplary embodiment, the user provides the personal information to the provider, after the user and the provider conclude therebetween the criterion, plan etc. for handling the personal information (rule or condition) as the privacy policy. Since the provider provides the privacy policy in one side in the typical conclusion scheme of the privacy policy, the privacy policy thus concluded does not necessarily reflect the intension of the user, and it is difficult to change the privacy policy along with the intension of the user. On the other hand, in the method of this exemplary embodiment, the privacy policy concluded reflects the user's intension, and can be changed along with the user's intension. Since the privacy policy is concluded while reflecting the user's intension in this way, the privacy policy is different among the users.

More specifically, the privacy policy is determined between the user and the provider in the way as described hereinafter. A case will be described, as shown in FIG. 1, wherein the user and provider 61, "telephone company", determine therebetween the privacy policy of the user's personal information, "telephone number". It is assumed here that the conditions (items) for handling the personal information in the privacy policy include, as shown in FIG. 3(A) for example, a right for accessing to the personal information ("access right"), a purpose of use of the personal information ("intended use"), a scheme of managing the personal information ("management scheme"), and a condition of redistribution (to destination) in the case of distributing the personal information ("redistribution condition").

Provider 61 defines beforehand a plurality of detailed contents on each of above conditions (items), and shows the defined contents to the user 64. The user 64 arbitrarily selects one of the contents, to thereby determine the detailed conditions of the privacy policy. In the example shown in FIG. 3(A), "user: rxw" and "manager: rx-" are selected as to the "access right", "user management", "provision of service", "marketing" and "advertisement" are selected as to the "intended use", "permanent use" is selected as to the "management scheme", and "telephone company", "bank" and "electric power company" are selected as to the "redistribution condition". In this way, a privacy policy specific to the user is determined by the user 64 and provider 61. Thus, provider 61 handles the user's personal information based on the determined privacy policy. The above method of determining the privacy policy is only an example, and the method is not necessarily restricted to such a method.

If the user 64 permits redistribution of the personal information, the personal information is distributed to another provider 62, 63. If the "redistribution condition" includes "bank" and "electric power company", as shown in FIG. 3(A), the "telephone company" is allowed to provide user's personal information, "telephone number", to the "bank" and "electric power company". Thus, user's personal information, "telephone number", is shared among the providers, "telephone company", "bank" and "electric power company".

If the plurality of providers 61, 62, 63 share thereamong the personal information, the provider (electric power company 62, bank 63) that receives the personal information from the other provider must use the personal information provided by the other provider within the range of the privacy policy concluded with respect to the user in the provider (telephone company 61) that acquired or issued the privacy policy. This is because use of the personal information outside the range of the privacy policy in the provider that acquired the personal information means use of the personal information beyond the range of consent by the user. Thus, the privacy policy with respect to the provided personal information is exchanged between the provider that acquired the personal information and the other provider (electric power company 62, bank 63) that receives the personal information, within the range of privacy policy in the provider (telephone company 61) that acquired the personal information.

FIG. 3(B) shows the privacy policy exchanged (concluded) between the telephone company 61 and the bank 63. FIG. 3(C) shows the privacy policy exchanged between the telephone company 61 and the electric power company 62. Each of the privacy policies shown in FIGS. 3(B) and 3(C) includes the contents of the privacy policy within the range concluded between the user and the telephone company.

The user 64 can change the contents of the privacy policy originally concluded with the provider (telephone company 61) based on the state of use etc. in the service providers 61, 62, and 63. For example, assuming that the privacy policy ("intended use" includes "user management", "provision of service", "marketing" and "advertisement") as shown in FIG. 3 (A) is concluded, the privacy policy can be changed into another privacy policy ("intended use" includes "user management" and "provision of service"), such as shown in FIG. 3(D). In this case, since the range of intended use of the personal information on which the user agrees is narrowed, there is a possibility that use of the personal information outside the range of the user's consent is performed in the electric power company or bank, unless the privacy policy is changed between the telephone company 61 and the bank 63 and between the telephone company 61 and the electric power company 62 based on the change of privacy policy performed in the telephone company 61. Thus, the telephone company 61 notifies a message of the policy change request (policy change notice), which requires change of the privacy policy, to the electric power company 62 and bank 63 that share the user's personal information, as shown in FIG. 1. Then, the electric power company 62 and bank 63 perform processing of the privacy policy change based on the message of policy change request transmitted from the telephone company 61.

The above description is a premise of the present invention, and the outline of the present invention. The configuration of the sharing management system of the first exemplary embodiment of the present invention will be described hereinafter in detail.

Figure 2:
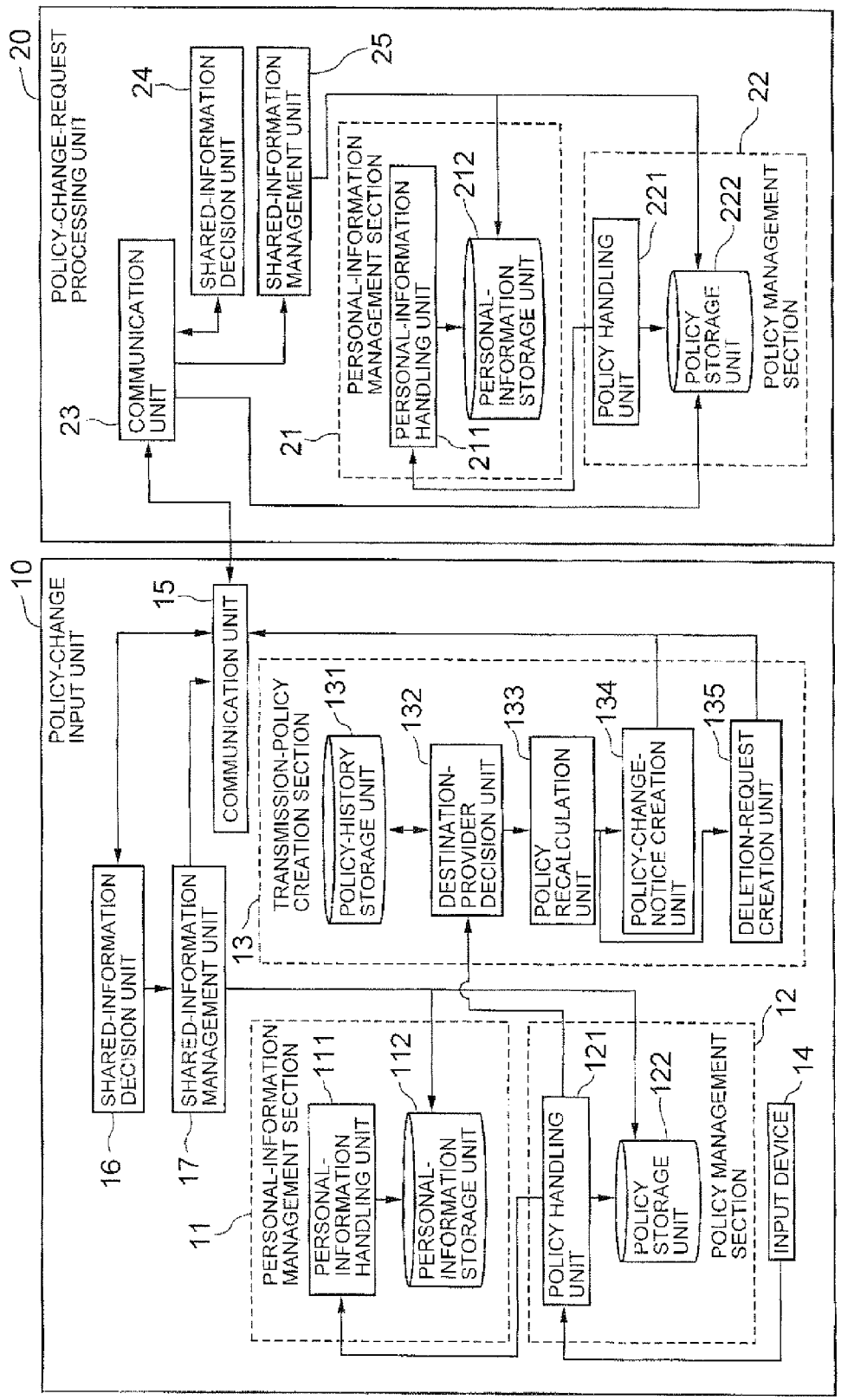
FIG. 2 is a block diagram showing the configuration of a sharing management system according to the first exemplary embodiment of the present invention.

FIG. 2 is a block diagram showing the configuration of the sharing management system of the first exemplary embodiment of the present invention. As shown in FIG. 2, the sharing management system of the first exemplary embodiment includes a policy-change input unit 10, and a policy-change-request processing unit 20. The policy-change input unit 10 corresponds to a device by which the telephone company in FIG. 1 manages the personal information and privacy policy, whereas the policy-change-request processing unit 20 corresponds to a device by which the electric power company and bank in FIG. 1 manages the personal information and privacy policy.

The policy-change input unit 10 accepts registration of the personal information and privacy policy of the user, and registers and manages the same. The policy-change input unit 10 performs processing of accepting a change of the privacy policy, and performs processing of changing the privacy policy. The policy-change input unit 10 judges whether or not it is needed to change the privacy policy exchanged with the other providers, and whether or not it is needed to delete the personal information managed by the other providers. The policy-change input unit 10 performs processing of transmitting a policy-change request message (referred to also as policy changer notice) that requests change of the privacy policy, or a deletion request of the personal information to the other providers (policy-change-request processing unit 20) based on the judged result.

As shown in FIG. 2, the policy-change input unit 10 includes a personal-information management section 11, a policy management section 12, transmission-policy creation section 13, an input device 14, a communication unit 15, a shared-information decision unit 16, and a shared-information management unit 17.

The personal-information management section 11 registers and manages the personal information. The personal-information management section 11 includes a personal-information handling unit 111 that performs registration, change and deletion of the personal information, and a personal-information storage unit 112 that stores (memorizes, keeps) the personal information of each user.

The policy management section 12 registers and manages the privacy policy. The policy management section 12 includes a policy handling unit 121 that performs registration, change and deletion of the privacy policy, and a policy storage unit 122 that stores (memorizes, keeps) the privacy policy of each user.

The transmission-policy creation section 13 recalculates the privacy policy exchanged with the other providers based on the change request of privacy policy from the user. The transmission-policy creation section 13 creates a policy-change request message or a deletion request of the personal information based on the result of recalculation of the privacy policy, and transmits the created policy-change request message or deletion request of the personal information to the policy-change-request processing unit 20 (in the other providers).

The transmission-policy creation section 13 includes, as shown in FIG. 2, a policy-history storage unit 131, a destination-provider decision unit 132, a policy recalculation unit 133, a policy-change-notice creation unit 134, and a deletion-request creation unit 135.

The policy-history storage unit 131 stores (memorizes, keeps) the personal information and privacy policy of each user transmitted to the other provider. Here, the policy-history storage unit 131 stores, in addition to the privacy policy that the other provider uses at present, a plurality of privacy policies transmitted to the same other provider in the past, as a transmitted history (or transmitted and received history). That is, there is a possibility that the changed privacy policy is transmitted to the other provider each time the user requests a change of the privacy policy, and if the privacy policy is transmitted to the other provider for a plurality of times, the privacy policy transmitted for the plurality of times is stored in the policy-history storage unit 131.

The destination-provider decision unit 132 determines the provider to which the policy-change request message or deletion request of the personal information may be transmitted, by judging whether or not the personal information and privacy policy are transmitted to the other provider based on the transmitted-history data of the privacy policy being stored in the policy-history storage unit 131.

The policy recalculation unit 133 compares the privacy policy that the other provider uses at present (the privacy policy that is most recently transmitted to the other provider; referred to as existing policy hereinafter) against the privacy policy with which replacement is requested from the user (referred to as updating policy hereinafter), to thereby judge whether or not it is needed to change the current policy in response to the privacy-policy change request.

Concretely, if the updating policy includes therein the existing policy, it is judged unnecessary to change the existing policy. If the existing policy includes therein the updating policy, or if a set intersection exists between the existing policy and the updating policy although the existing policy does not include therein the updating policy, then it is judged necessary to change the existing policy. Thus, if the existing policy includes therein the updating policy, the updating policy is selected as the privacy policy to be transmitted to the other provider (that is, privacy policy used for updating in the other provider; referred to as transmission policy hereinafter); whereas if the set intersection exists between the existing policy and the updating policy, the common part (common item and contents) between the existing policy and the updating policy is selected as the transmission policy to be transmitted to the other provider.

If the case is other than the above three cases (if the existing policy does not include the updating policy, and there is no set intersection between the existing policy and the updating policy), then it is judged that the other provider (provider determined by the destination-provider decision unit 132) cannot use the personal information of the user that requested change of the privacy policy.

The policy-change-notice creation unit 134 creates a policy-change request message (policy-change notice) that requires change of the privacy policy to the other providers, if it is judged necessary by the policy recalculation unit 133 to change the existing policy. The policy-change request message includes information of the privacy policy that is recalculated (changed) by the policy recalculation unit 133.

The deletion-request creation unit 135 creates a deletion request of the personal information to be transmitted to the other providers, if it is judged by the policy recalculation unit 133 that the other providers are not allowed to use the personal information of the user for which the user changed the privacy policy.

The input device 14 inputs a change of the privacy policy in response to a change request from the user. The communication unit 15 communicates (transmits and receives) predetermined information to the other providers via a communication line, a communication network etc. A dedicated line etc. may be used as the communication line, and networks such as a telephone network and the Internet may be used as the communication network.

The shared-information decision unit 16 negotiates with other providers, and determines the personal information to be shared with the other providers and the privacy policy with respect to the personal information. The shared-information management unit 17 creates a message for transmitting collectively the personal information shared with the other providers and the privacy policy with respect to the personal information.

The policy-change-request processing unit 20 accepts, registers and manages registration of the personal information and privacy policy of the user. The policy-change-request processing unit 20 performs processing of accepting a change of the privacy policy and changing the privacy policy.

As shown in FIG. 2, the policy-change-request processing unit 20 includes a personal-information management section 21, a policy management section 22, a communication unit 23, a shared-information decision unit 24, and a shared-information management unit 25.

The policy-change-request processing unit 20 has a configuration similar to the configuration of the policy-change input unit 10 only except for absence of the configuration corresponding to the transmission-policy creation section 13 provided in the policy-change input unit 10.

More specifically, the personal-information management section 21 registers and manages the personal information. The personal-information management section 21 includes a personal-information handling unit 211 that performs registration, change and deletion of the personal information, and a personal-information storage unit 212 that stores (memorizes, keeps) therein the personal information of each user.

The policy management section 22 registers and manages the privacy policy. The policy management section 22 includes a policy handling unit 221 that performs registration, change and deletion of the privacy policy, and a policy storage unit 222 that stores (memorizes, keeps) the privacy policy of each user.

The communication unit 23 communicates (transmits and receives) predetermined information with the other providers via the communication lines, communication network, etc. The shared-information decision unit 24 negotiates with the other providers, and determines the personal information shared with the other providers and the privacy policy with respect to the personal information. The shared-information management unit 25 creates a message for transmitting collectively the personal information shared with the other providers and the privacy policy with respect to the personal information.

Next, operation of the sharing management system in the first exemplary embodiment of the present invention will be described.

(1) Registration of Personal Information and Privacy Policy:

First, registration of the personal information and privacy policy of the user is performed in the policy-change input unit 10. Concretely, the personal-information handling unit 111 of the personal-information management section 11 registers, in the personal-information storage unit 112, the personal information (address, name, age etc.) provided by the user or the personal information (telephone number in the case of telephone company) issued by the provider itself. The policy handling unit 121 of the policy management section 12 registers, in the policy storage unit 122, the privacy policy concluded between the user and the provider. In this exemplary embodiment, it is assumed that the provider that manages the policy-change input unit 10 is the telephone company in FIG. 1. It is also assumed that the provider that manages the policy-change-request processing unit 20 is the electric power company or bank. It is also assumed that the personal information that the provider (telephone company) handles is the telephone number in FIG. 3. It is also assumed that the privacy policy concluded between the user and the provider includes the contents shown in FIG. 3 (A).

(2) Sharing of Personal Information and Privacy Policy:

FIG. 4 is a flowchart showing a personal-information sharing processing in the first exemplary embodiment of the present invention. In order to share the personal information and privacy policy among the providers, the shared-information decision unit 16 of the policy-change input unit 10 and the shared-information decision unit 24 of the policy-change-request processing unit 20 first negotiate with each other to determine the personal information and privacy policy to be shared among the providers (step S1).

Specifically, the shared-information decision unit 24 of the policy-change-request processing unit 20 discloses the privacy policy, such as a sort of the personal information to be requested and the intended use thereof, to the policy-change input unit 10. Then, the shared-information decision unit 16 of the policy-change input unit 10 compares the privacy policy (for example, privacy policy concluded with the user, show in FIG. 3 (A)) with respect to the personal information newly registered against the privacy policy disclosed by the shared-information decision unit 24. If the result of comparison exhibits a matching, the policy-change input unit 10 judges that the policy-change-request processing unit 20 is allowed to handle the personal information, whereas if it exhibits a mismatching, the policy-change input unit 10 judges that the policy-change-request processing unit 20 is not allowed to handle the personal information. By iterating such a processing, the personal information and privacy policy to be shared among the providers are determined. A method for determining the personal information and privacy policy to be shared among the providers is disclosed in more detail in Japanese Patent Application No. 2005-171329, which method may be used here.

Next, in the policy-change input unit 10, the shared-information management unit 17 creates shared information that includes the personal information determined in the processing of step S1 and the privacy policy with respect to the personal information (step S2). The shared-information management unit 17 transmits the created shared information to the policy-change-request processing unit 20 via the communication unit 15 (step S3). In order to share the personal information among the providers, it is insufficient to share only the personal information, and it is needed to share both of the personal information and privacy policy. This is because the personal information can be used only within the range of the user's consent, and thus the other providers must observe the privacy policy that the user has agreed. When the shared information is transmitted by the shared-information management unit 17, the privacy policy is stored in the policy-history storage unit 131 as the transmission history.

Next, in the policy-change-request processing unit 20, the shared-information decision unit 24 receives the shared information from the policy-change input unit 10 via the communication unit 23 (step S4). The shared-information management unit 25 separates the received, shared information into the personal information and privacy policy, registers the personal information of each user in the personal-information storage unit 212, and registers the privacy policy of each user in the policy storage unit 222 (step S5). This is the end of the personal-information sharing processing.

Figure 5:
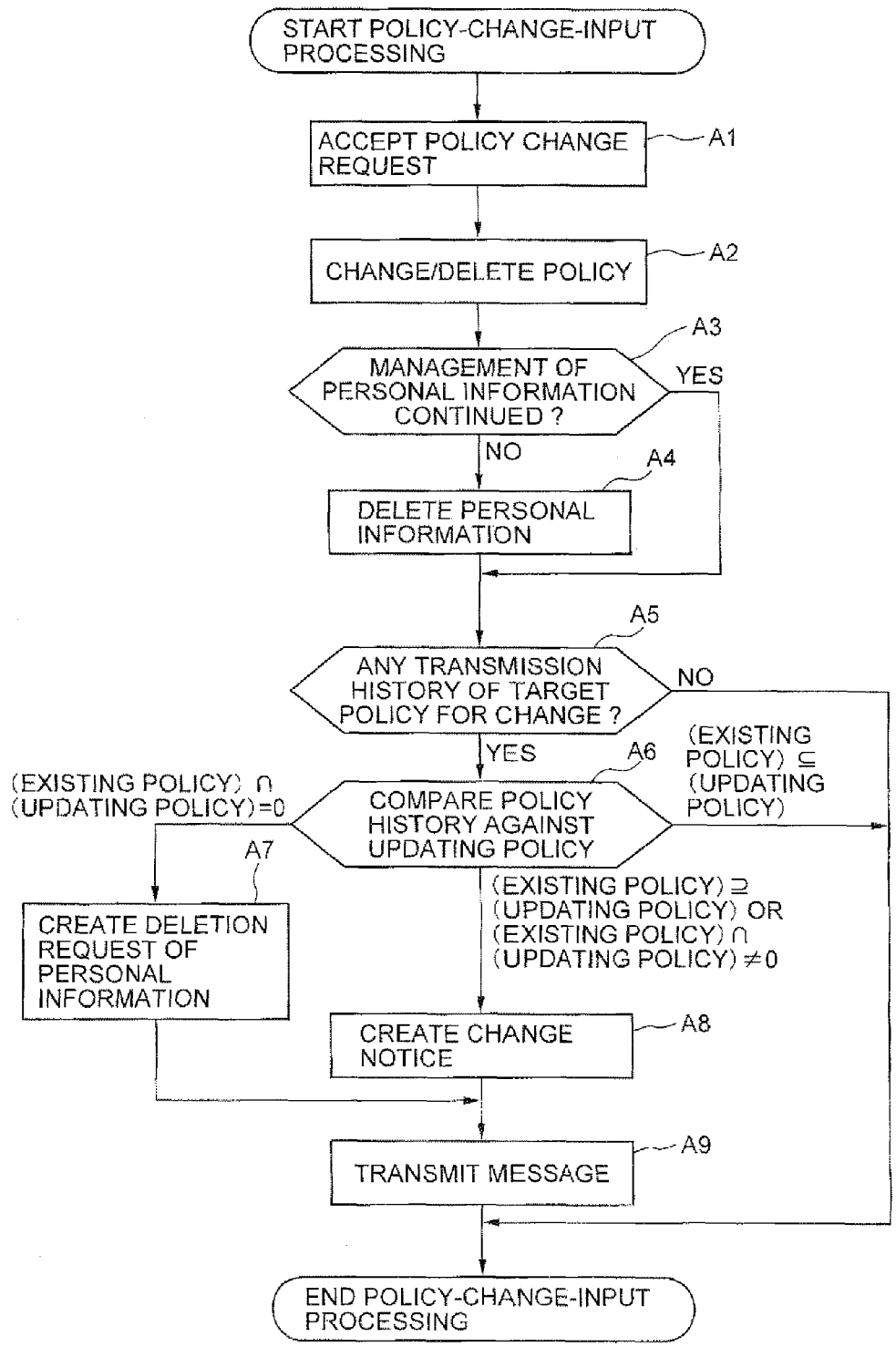
FIG. 5 is a flowchart showing an input processing of the policy change in the first exemplary embodiment of the present invention.

(3) Change of Privacy Policy Requested from User:

FIG. 5 is a flowchart showing the policy-change input processing in the first exemplary embodiment of the present invention. In the policy-change input processing, a user first transmits a change request of the privacy policy to the policy-change input unit 10 via the own terminal (for example, personal computer), if he wishes to change the privacy policy with respect to the personal information registered in the telephone company. In the policy-change input unit 10, the input device 14 receives and accepts the change request of privacy policy from the user terminal (step A1). The change request of privacy policy from the user terminal includes a privacy policy (updating policy) in which contents thereof are updated. It is assumed here that the privacy policy has the contents of FIG. 3(D), for example.

The policy handling unit 121 registers in the policy storage unit 122 the updating policy received by the input device 14 (step A2). It is judged whether or not the policy handling unit 121 needs to continue management of the personal information after changing the privacy policy (step A3). For example, if the intended use of the updating policy does not match the intended use of the personal information desired by the telephone company, it is judged that management of the personal information of the user is not to be continued. If it is judged that management of the personal information is to be continued (Yes in step A3), the process advances to step A5. If it is judged that management of the personal information is not to be continued (No in step A3), the personal-information handling unit 111 deletes the personal information of the user stored in the personal-information storage unit 112 based on the instruction from the policy handling unit 121 (step A4).

Subsequently, the destination-provider decision unit 132 retrieves the data stored in the policy-history storage unit 131 to investigate whether or not the transmission history of the target privacy policy for the change exists therein, and judges whether or not the policy-change input unit 10 has transmitted the personal information and privacy policy to the other providers (step A5).

If there is no transmission history of the target privacy policy for the change (No in step A5), the policy-change input processing is ended because it means the other providers do not use the personal information.

If there is a transmission history of the target privacy policy for the change (Yes in step A5), it means the other providers use the personal information relating to the target privacy policy for the change. In this case, the policy recalculation unit 133 compares the existing policy (privacy policy obtained in step A5) against the updating policy (privacy policy obtained in step A1), to judge whether or not it is needed to change the existing policy based on the contents of the updating policy (step A6).

More specifically, the policy recalculation unit 133 first investigates the inclusive relationship between the existing policy and the updating policy. If the updating policy includes the existing policy, it is judged unnecessary to change the existing policy. This is the end of the policy-change input processing.

If the existing policy includes the updating policy, it is judged necessary to change the existing policy. In this case, the policy recalculation unit 133 considers the updating policy as a transmission policy to be transmitted to the other providers. If the existing policy does not include the updating policy, and yet there exists a set intersection between the existing policy and the updating policy, it is judged necessary to change the existing policy. In this case, the policy recalculation unit 133 determines the common part (common item and contents) between the existing policy and the updating policy as a transmission policy to be transmitted to the other providers. Then, the policy-change-notice creation unit 134 creates a policy-change request message (policy change notice) (step A8).

If the existing policy does not include the updating policy and there is no set intersection between the existing policy and the updating policy, it is judged that the other providers (providers determined by destination-provider decision unit 132) cannot use the personal information of the user that requested change of the privacy policy. In this case, the deletion-request creation unit 135 creates a deletion request of the personal information (step A7).

Since the "redistribution condition" in the updating policy (FIG. 3(D)) includes the bank and electric power company in the example shown in FIG. 3, the bank and electric power company can still use the personal information, "telephone number". Since the "intended use" of the updating policy (FIG. 3 (D)) includes "user management and provision of service", and the "intended use" of the existing policy (FIG. 3 (B)) in the bank is the "user management", it means the updating policy includes the existing policy. Therefore, the policy recalculation unit 133 judges that there is no need to change the existing policy, whereby the updated privacy policy need not be transmitted to the bank. On the other hand, since the "intended use" of the updating policy (FIG. 3 (D)) is "user management and provision of service", and the "intended use" of the existing policy (FIG. 3 (C)) in the electric power company is "marketing", it means the existing policy does not include the updating policy and there is no set intersection between the existing policy and the updating policy. Thus, the policy recalculation unit 133 judges that the electric power company cannot use the personal information, "telephone number", and a deletion request of the personal information is created.

Subsequently, the communication unit 15 transmits, based on the instruction from the policy-change-notice creation unit 134 or deletion-request creation unit 135, the message (policy-change request message or deletion request of the personal information) created by the policy-change-notice creation unit 134 or deletion-request creation unit 135 to the policy-change-request processing unit 20 of the other providers (step A9). This is the end of the policy-change input processing.

Figure 6:
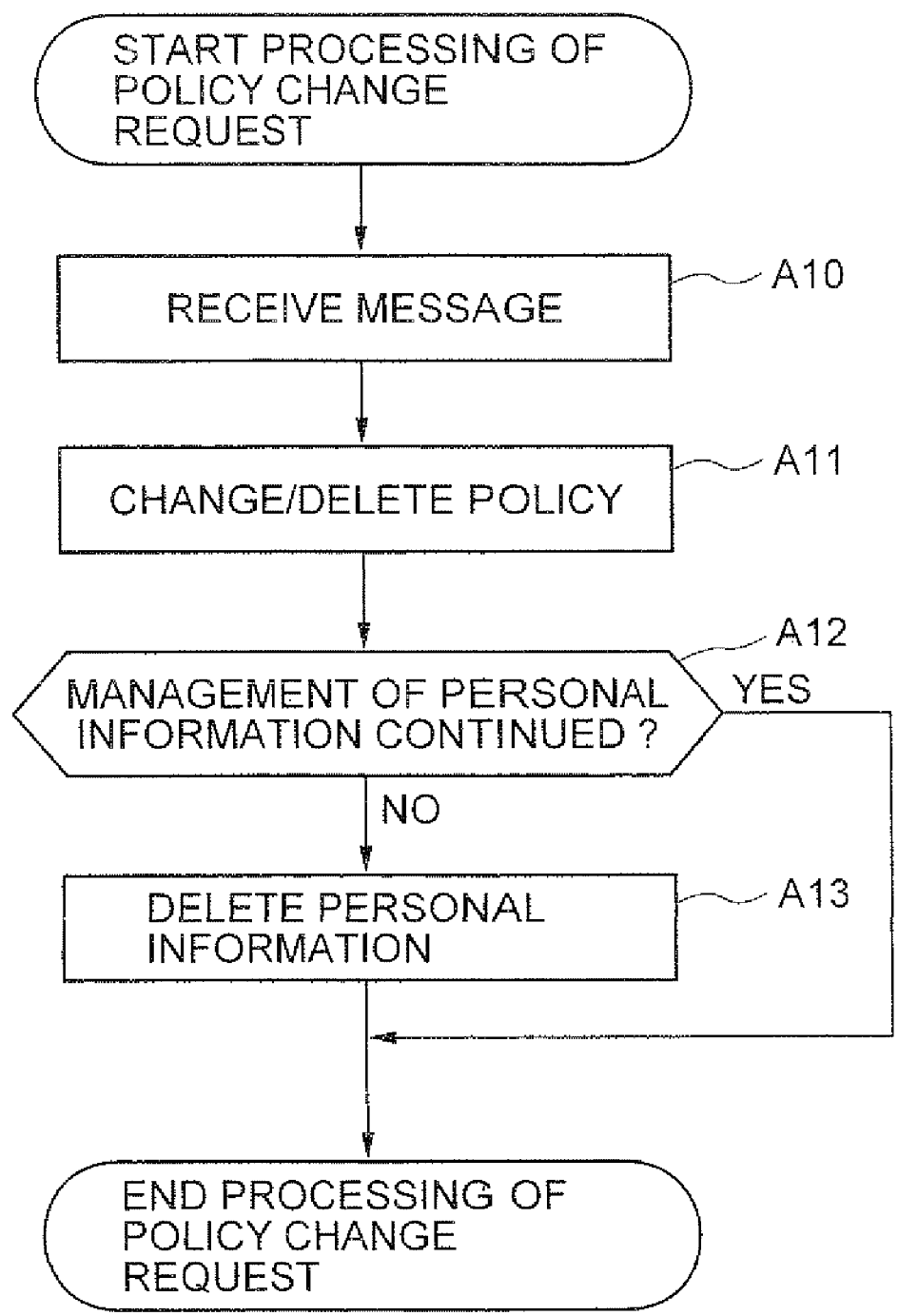
FIG. 6 is a flowchart showing a processing of the policy change request in the first of exemplary embodiment of the present invention.

(4) Change Request of Privacy Policy from Provider:

FIG. 6 is a flowchart showing the policy-change request processing in the first exemplary embodiment of the present invention. In the policy-change request processing, the communication unit 23 of the policy-change-request processing unit 20 first receives the message transmitted from the policy-change input unit 10 (step A10). If the message received by the communication unit 23 is a policy-change request message, the policy handling unit 221 changes the privacy policy with respect to the personal information of the user stored in the policy storage unit 222 based on the contents of the policy-change request message (step A11).

The policy handling unit 221 judges whether or not it is needed to continue management of the personal information (step A12). If the message received by the communication unit 23 is a deletion request of the personal information, it is judged that management of the personal information is not to be continued. If the message received by the communication unit 23 is a policy-change request message, and yet there is no need to manage the personal information due to the change of privacy policy, it is judged that the personal information is not to be managed. For example, if the intended use specified in the updated (changed) privacy policy does not match the intended use of the personal information desired in the bank or electric power company any more, it is judged that management of the personal information of the user is not to be continued. If it is judged that management of the personal information is not to be continued (Yes in step A12), the personal-information handling unit 211 deletes, based on the instruction for the policy handling unit 221, the personal information of the user stored in the personal-information storage unit 212 (step A13). This is the end of the policy-change request processing.

As described heretofore, due to the configuration in the first exemplary embodiment wherein the policy recalculation unit 133 compares the existing policy against the updating policy, recalculates, based on the result of comparison, the transmission policy to be transmitted to the other providers, and transmits the recalculated transmission policy to the other providers, change of the privacy policy can be reflected within the range of user's consent on the providers sharing thereamong the personal information.

In addition, due to the configuration wherein if the policy recalculation unit 133 judges that the other providers cannot use the personal information as a result of change of the privacy policy by the user, that is, if it is judged that the intended use etc. in the other providers does not match the privacy policy changed by the user, the deletion-request creation unit 135 transmits a deletion request of the personal information to the other providers, the lifecycle of the personal information can be suitably managed (controlled). Thus, it is possible to assuredly prevent the personal information from being used in the intended use etc. that the user does not wish.

In the above first exemplary embodiment, the described configuration is such that the telephone company first registers and manages the user's personal information, and transmits the user's personal information to the bank or electric power company to allow the use (management) thereof. However, the configuration may be such that each of the telephone company, bank and electric power company first registers and manages the user's personal information, and transmits the user's personal information to the other providers (providers other than the each, such as the telecommunication company) to allow the use (management) thereof. In this case, the configuration corresponding to the input device 14 and transmission-policy creation section 13 in the policy-change input unit 10 is added to the policy-change-request processing unit 20 that the bank or electric power company manages. That is, there is provided not only the configuration of processing the change request of privacy policy input from the policy-change input unit 10, but also the configuration of accepting a change request from the user that requests the change of privacy policy to the policy-change input unit 10. With such a configuration, each of the telephone company, bank and electric power company can share the personal information that the each provider registers.

Second Exemplary Embodiment

Figure 7:
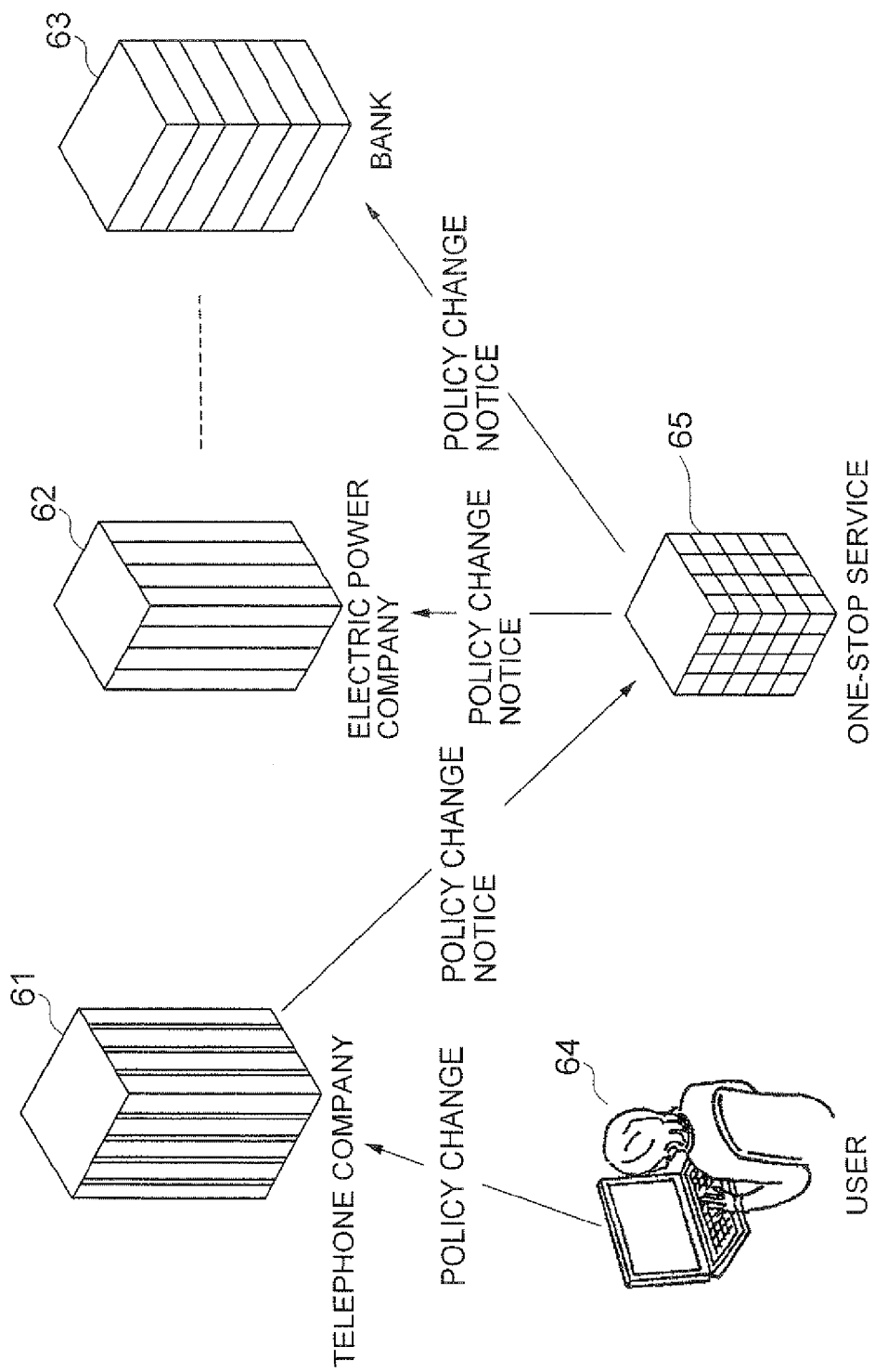
FIG. 7 is an explanatory diagram showing the relationship among the providers in a second exemplary embodiment of the present invention.

FIG. 7 is an explanatory diagram showing the relationship among the providers in the second exemplary embodiment of the present invention. The configuration shown in FIG. 1 is such that telephone company, electric power company and bank are shown as the providers. On the other hand, the configuration shown in FIG. 7 is such that a one-stop service provider 65 is shown as a provider, in addition to the telephone company 61, electric power company 62 and bank 63.

In the configuration shown in FIG. 7, the user 64 transmits, if he wishes to change the privacy policy, a changed privacy policy to the provider (telephone company 61), to which the user first provided the personal information or which first issued the personal information, to request a change of the privacy policy. The provider 61 that is requested to change the privacy policy performs change processing of the privacy policy based on the changed privacy policy (privacy policy transmitted from the user terminal), and also transmits the changed privacy policy to the one-stop service provider 65 as a policy change notice (policy-change request message).

The one-stop service provider 65 judges whether or not it is needed to change the privacy policy that is exchanged with the other providers (bank 63, electric power company 62) based on the policy change notice from the specific provider (telephone company 61). If it is judged that the change is needed, the one-stop service provider transmits a policy change notice (policy-change request message) including the changed information of the privacy policy to the other providers 62 and 63. In this configuration, it is possible to reduce the burden of processing of exchanging the policy change notice in each provider, as compared to the configuration wherein the plurality of providers separately exchange therebetween the policy change notice.

Figure 8:
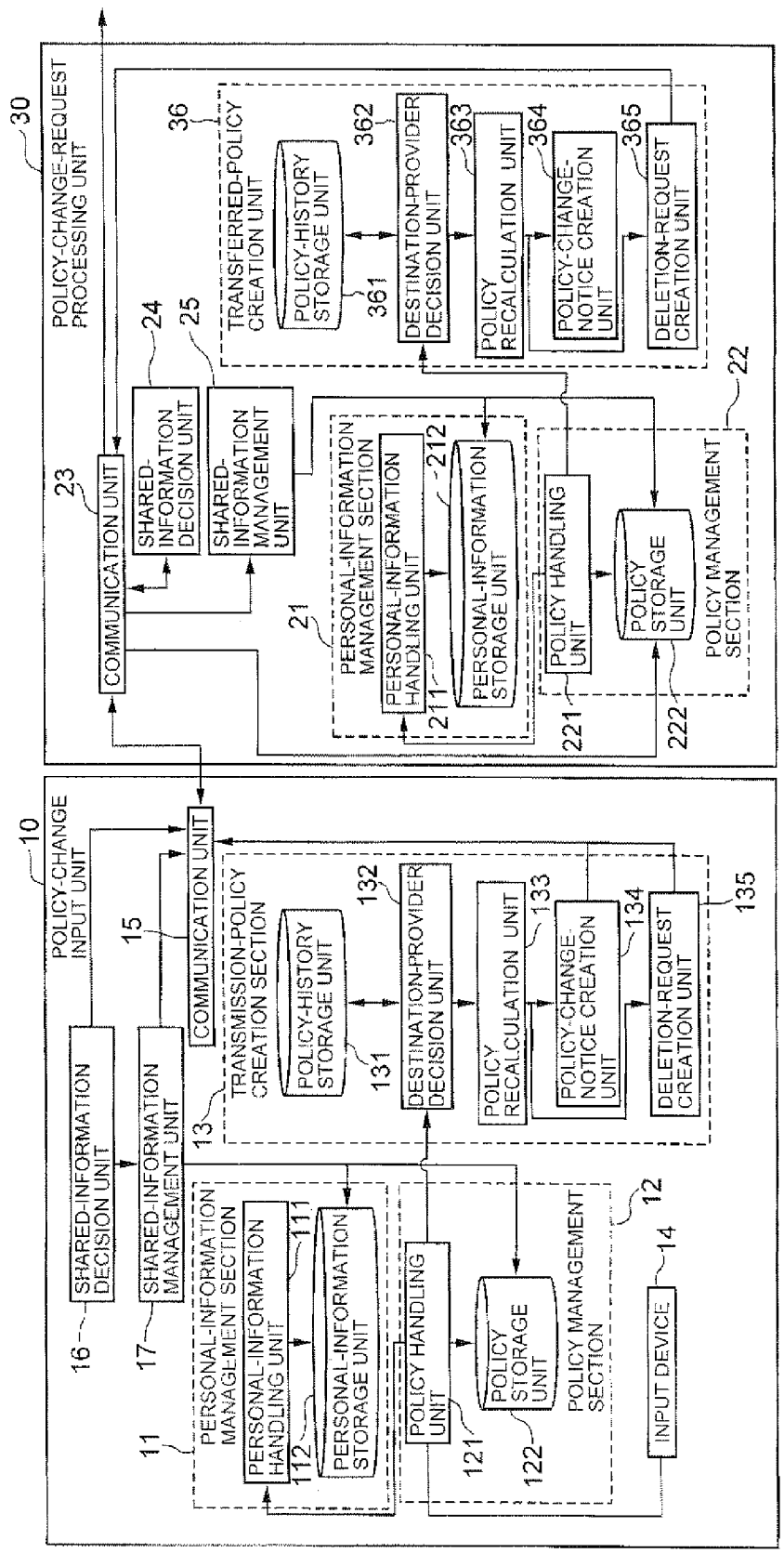
FIG. 8 is a block diagram showing the configuration of a sharing management system in the second exemplary embodiment of the present invention.

FIG. 8 is a block diagram showing the configuration of sharing management system in the second exemplary embodiment of the present invention. As shown in FIG. 8, the sharing management system in the second exemplary embodiment includes a policy-change input unit 10 and a policy-change-request processing unit 30. The policy-change input unit 10 corresponds to a device by which the telephone company (the same applies to electric power company and bank) in FIG. 7 manages the personal information and privacy policy, whereas the policy-change-request processing unit 30 corresponds to a device by which the one-stop service provider in FIG. 7 transfers the policy change notice transmitted from the specific provider (telephone company in the example of FIG. 7) toward the other providers (electric power company and bank in the example of FIG. 7).

As shown in FIG. 8, the configuration of policy-change input unit 10 is similar to the configuration of policy-change input unit 10 shown in FIG. 2. The configuration of policy-change-request processing unit 30 is such that a transferred-policy creation section 36 is added to the configuration of policy-change-request processing unit 20 shown in FIG. 2. Description of the configuration similar to the configuration shown in FIG. 2 will be omitted here.

The transferred-policy creation section 36 recalculates the privacy policy that is exchanged with the other providers (electric power company and bank in the example of FIG. 7) based on the privacy policy (privacy policy changed by the user in this case) transmitted from the specific provider (telephone company in the example of FIG. 7). The transferred-policy creation section 36 creates a policy-change request message or a deletion request of the personal information based on the result of recalculation, and transmits the created policy-change request message or deletion request of the personal information to the other providers.

The transferred-policy creation section 36 includes, as shown in FIG. 8, a policy-history storage unit 361, a destination-provider decision unit 362, a policy recalculation unit 363, a policy-change-notice creation unit 364, and a deletion-request creation unit 365.

The policy-history storage unit 361 stores (memorizes, keeps) therein the personal information and privacy policy of each user transmitted to the other providers. The policy-history storage unit 361 stores not only the privacy policy that the other providers use at present, but also a plurality of privacy policies transmitted to the same providers as the transmission history (or transmission/reception history). That is, the changed privacy policy may be transmitted to the other providers whenever a transmission of the privacy policy is received from a specific provider; and if the privacy policy is transmitted to the other providers for a plurality of times, the privacy policy transmitted for the plurality of times is stored in the policy-history storage unit 131.

The destination-provider decision unit 362 investigates whether or not the personal information and privacy policy have already been transmitted to the other providers based on the data of the transmission history of the privacy policy stored in the policy-history storage unit 361, to thereby determine the providers that may transmit the policy-change request message or deletion request of the personal information.

The policy recalculation unit 363 compares the privacy policy used by the other providers (privacy policy most recently transmitted to the other providers, referred to as transmitted privacy policy hereinafter) against the privacy policy acquired from the specific provider (privacy policy for which the use requested the change, referred to as acquired policy hereinafter), and judges whether or not change of the transmitted policy is needed based on the contents of the acquired policy.

More specifically, if the acquired policy includes the transmitted policy, it is judged unnecessary to change the transmitted policy. If the transmitted policy includes the acquired policy, or if the transmitted policy does not include the acquired policy and yet there is a set intersection between the transmitted policy and the acquired policy, then it is judged necessary to change the transmitted policy. If the transmitted policy includes the acquired policy, the acquired policy is determined as the privacy policy to be transmitted to the other providers (privacy policy used for update in the other providers, referred to as transmission policy hereinafter). If there is a set intersection between the transmitted policy and the acquired policy, the common part (common item and contents) between the transmitted policy and the acquired policy is determined as the transmission policy to be transmitted to the other providers.

If the present case is other than the above three cases (if the transmitted policy does not include the acquired policy, and there is no set intersection between the transmitted policy and the acquired policy), it is judged that the other providers (providers determined by destination-provider decision unit 362) cannot use the personal information of the user that requested the change of privacy policy.

The policy-change-notice creation unit 364 creates a policy-change request message (policy change notice) that requires change of the privacy policy to the other providers, if the policy recalculation unit 363 judges that it is needed to change the transmitted policy. The policy-change request message also includes information of the privacy policy that is recalculated (changed) by the policy recalculation unit 363.

The deletion-request creation unit 365 creates a deletion request of the personal information to be transmitted to the other providers, if the policy recalculation unit 363 judges that the other providers cannot use the personal information of the user that requested the change of privacy policy.

Since the one-stop service provider serves in principle as a relay unit that relays the message exchanged among the providers, it is not needed for the one-stop service provider to manage the personal information managed in each provider.

In this case, the policy-change-request processing unit 30 need not include the configuration of personal-information management section 21 and policy management section 22. However, as shown in FIG. 8, the one-stop service provider (policy-change-request processing unit 30) may have the configuration of personal-information management section 21 and policy management section 22, and manage the personal information managed in each provider (telephone company, electric power company etc.). In this configuration, if a failure etc. occurs in the device of each provider, data of the personal information etc. that the policy-change-request processing unit 30 manages may serve as backup data, which allows restoration of data of the personal information etc.

Operation of the sharing management system in the second exemplary embodiment of the present invention will be described hereinafter.

(1) Registration of Personal Information and Privacy Policy:

Since the registration processing of the personal information and privacy policy in the policy-change input unit 10 is similar to that described in the first exemplary embodiment, description thereof will be omitted herein. In the present exemplary embodiment, it is assumed that the provider that manages the policy-change input unit 10 is the telephone company in FIG. 7. It is also assumed that the provider that manages the policy-change-request processing unit 30 is the one-stop service provider. It is assumed that the personal information managed by the telephone company, electric power company and bank is the telephone number shown in FIG. 9. It is assumed that the privacy policy concluded between the telephone company and the one-stop service provider (same as the privacy policy in the contents concluded between the user and the provider (telephone company)) has the contents shown in FIG. 9(A).

Also in the one-stop service provider (policy-change-request processing unit 30), if the configuration is such that the personal information managed by the telephone company (policy-change input unit 10) is to be managed, the personal information and privacy policy registered in the policy-change input unit 10 is transmitted to the policy-change-request processing unit 30, and the personal information and privacy policy are registered in the personal-information storage unit 212 and policy storage unit 222, respectively, in the policy-change-request processing unit 30.

(2) Sharing of Personal Information and Privacy Policy:

In the first exemplary embodiment, the contents of the personal information and privacy policy to be shared are separately determined by negotiation between the providers. However, in the second exemplary embodiment, the one-stop service provider determines the contents of the personal information and privacy policy to be shared between the provider (telephone company in the example shown in FIG. 7) that originally issued the personal information and the other providers (electric power company and bank in the example shown in FIG. 7) by negotiation on behalf of the other providers.

The method of determining the contents of the personal information and privacy policy to be shared is roughly similar to that in the first exemplary embodiment. That is, the shared-information decision unit 24 of the policy-change-request processing unit 30 discloses the sort of the personal information and the intended use etc. of the privacy policy that the other providers request (contents of the privacy policy are different among the other providers) to the policy-change input unit 10 on behalf of the other providers. Then, the shared-information decision unit 16 of the policy-change input unit 10 compares the privacy policy with respect to the personal information newly registered (privacy policy concluded with the user) against the privacy policy disclosed by the shared-information decision unit 24. If the result of comparison exhibits a matching, the policy-change input unit 10 judges that the other providers can handle the personal information, whereas if the results exhibits a mismatching, the policy-change input unit 10 judges that the other provides cannot handle the personal information. By iterating such a processing, the personal information and privacy policy to be shared between the provider that originally issued the personal information and the other providers are determined.

Thereafter, in the policy-change input unit 10, the shared-information management unit 17 creates shared information that collectively includes the personal information determined by the negotiation and the privacy policy with respect to the personal information. Then, the shared-information management unit 17 transmits the shared information thus created to the policy-change-request processing unit 20 via the communication unit 15.

Thereafter, in the policy-change-request processing unit 30, the shared-information decision unit 24 receives via the communication unit 23 the shared information transmitted from the policy-change input unit 10. The shared-information management unit 25 separates the received, shared information into the personal information and the privacy policy, registers the personal information of each provider in the personal-information storage unit 212, and registers the privacy policy of each provider in the policy storage unit 222. The shared-information management unit 25 then transfers the received, shared information to the other providers. If the shared information is transferred from the shared-information management unit 25, the shared information is also registered in the policy-history storage unit 361 as the transmission/reception history of the privacy policy. The other providers separate, into the personal information and privacy policy, the shared information transmitted from the policy-change-request processing unit 30 (one-stop service provider), and registers the personal information and privacy policy.

As described above, the one-stop service provider executes the processing of determining the contents of the personal information and privacy policy to be shared on behalf of the other providers. The shared-information management unit 25 of the policy-change-request processing unit 30 may transfer the shared information transmitted form the policy-change input unit 10 toward the other providers as it is without registering the same in the personal-information storage unit 212 and policy storage unit 222. This is because the one-stop service provider itself does not need to manage the personal information. In such a configuration, the policy-change-request processing unit 30 need not have the configuration of personal-information management section 21 and policy management section 22.

(3) Change of Privacy Policy from User:

In the second exemplary embodiment, processing of steps A1-A4 in FIG. 5 is performed similarly to the first exemplary embodiment. That is, if the user wishes to change the privacy policy with respect to the personal information registered in the telephone company, the user transmits a change request of the privacy policy to the policy-change input unit 10 via the own terminal (for example, personal computer). In the policy-change input unit 10, the input device 14 receives and accepts the change request of privacy policy from the user terminal (step A1). The change request of privacy policy from the user includes the privacy policy including updated contents (updating policy). It is assumed that the updating policy updated by the user has the contents shown in FIG. 9(D), for example.

The policy handling unit 121 registers in the policy storage unit 122 the updating policy received by the input device 14 (step A2). Then, the policy handling unit 121 judges whether or not it is needed to continue management of the personal information after the change of privacy policy (step A3). For example, it is judged that management of the personal information of the user is not to be continued if the intended use in the updating policy does not match the intended use of the personal information desired in the telephone company. If it is judged that management of the personal information is not to be continued (No in step A3), the personal-information handling unit 111 deletes the personal information of the user stored in the personal-information storage unit 112 based on the instruction by the policy handling unit 121 (step A4).

In the first exemplary embodiment, the policy-change input unit 10 judges whether or not it is needed to change the privacy policy in the other providers, and whether or not it is needed to delete the personal information, based on the change request of privacy policy from the user, and transmits the policy-change request message or deletion request of the personal information based on the result of judgment (refer to steps A5-A9). However, in the second exemplary embodiment, the policy-change-request processing unit 30 (one-stop service provider) performs instead the judgment whether or not it is needed to change the privacy policy in the other providers, and whether or not it is needed to delete the personal information. Therefore, the policy-change input unit 10 transmits, upon occurring of the change request of privacy policy from the user, the privacy policy changed by the user as a policy-change request message (policy change notice) to the policy-change-request processing unit 30. The policy-change request message includes the privacy policy (acquired policy) including updated contents. For example, it is assumed that the acquired policy updated by the user has the contents shown in FIG. 9(E).

(4) Change Request of Privacy Policy from Provider:

FIG. 10 is a flowchart showing the policy-change request processing in the second exemplary embodiment of the present invention. In the policy-change request processing, the communication unit 23 of the policy-change-request processing unit 30 first receives the message transmitted from the policy-change input unit 10 (step A10). Then, the policy handling unit 221 changes the privacy policy with respect to the personal information of the user stored in the policy storage unit 222 based on the privacy policy (acquired policy) changed by the user and included in the message received by the communication unit 23 (step A11).

The policy handling unit 221 judges whether or not it is needed to continue management of the personal information (step A12). If management of the personal information is not needed after the change of privacy policy, it is judged that the personal information is not to be managed. For example, if the intended use in the updated (changed) privacy policy does not match the intended use of the personal information desired in the provider, it is judged that management of the personal information of the user is not to be continued. If it is judged that management of the personal information is not to be continued (Yes in step A12), the personal-information handling unit 211 deletes the personal information of the user stored in the personal-information storage unit 212 based on the instruction from the policy handling unit 221 (step A13).

Thereafter, the destination-provider decision unit 362 retrieves the data stored in the policy-history storage unit 361, to investigate whether or not there is a transmission history of the target privacy policy for the change, thereby judging whether or not the policy-change-request processing unit 30 has transmitted the personal information and privacy policy to the other providers (step B1).

If there is no transmission history of the target privacy policy for the change (No in step B1), it means the providers (electric power company or bank) do not use the personal information with respect to the target privacy policy for the change, whereby the policy-change request processing is ended.

If there is a transmission history of the target privacy policy for the change (Yes in step B1), it means the other providers use the personal information with respect to the target privacy policy for the change. In this case, the policy recalculation unit 363 compares the transmitted policy (privacy policy acquired in step B1) against the acquired policy (privacy policy acquired in step A10), to judge whether or not it is needed to change the transmitted policy based on the contents of the acquired policy (step B2).

More concretely, the policy recalculation unit 363 first investigates the inclusive relationship between the transmitted policy and the acquired policy. If the transmitted policy includes the acquired policy, it is judged not necessary to change the transmitted policy. Thus, the policy-change request processing is ended.

If the transmitted policy includes the acquired policy, it is judged necessary to change the transmitted policy. In this case, the policy recalculation unit 363 determines the acquired policy as the transmission policy to be transmitted to the other providers. If the transmitted policy does not include the acquired policy and yet there is a set intersection between the transmitted policy and the acquired policy, it is judged necessary to change the transmitted policy. In this case, the policy recalculation unit 363 determines the common part (common item and contents) between the transmitted policy and the acquired policy as a transmission policy to be transmitted to the other providers. Then, the policy-change-notice creation unit 364 creates a policy-change request message (policy change notice) (step B4).

If the transmitted policy does not include the acquired policy and there is no set intersection between the transmitted policy and the acquired policy, it is judged that the other providers (providers determined by destination-provider decision unit 362) cannot use the personal information of the user that requested change of the privacy policy. In this case, the deletion-request creation unit 365 creates a deletion request of the personal information (step B3).

In the example shown in FIG. 9, since the "redistribution condition" in the acquired policy (FIG. 9(D)) includes the bank and electric power company, it is still possible for the bank and electric power company to use the personal information, "telephone number." Since the "intended use" in the acquired policy (FIG. 9(D)) is "user management and provision of service" and the "intended use" in the transmitted policy (FIG. 9(B)) in the bank" is "user management", it means the acquired policy includes the transmitted policy. Thus, the policy recalculation unit 363 judges that it is not needed to change the transmitted policy, and thus it is not needed to transmit the updated privacy policy to the bank. On the other hand, since the "intended use" in the acquired policy (FIG. 9(D)) is "user management and provision of service" and the "intended use" in the transmitted policy (FIG. 9(C)) in the electric power company" is "marketing", it means the transmitted policy does not include the acquired policy and there is no set intersection between the transmitted policy and the acquired policy. Thus, the policy recalculation unit 363 judges that the electric power company cannot use the personal information, "telephone number", whereby a deletion request of the personal information is created.

Thereafter, the communication unit 23 transmits the message (policy-change request message or deletion request of the personal information) created by the policy-change-notice creation unit 364 or deletion-request creation unit 365 to the other providers, based on the instruction from the policy-change-notice creation unit 364 or deletion-request creation unit 365 (step B5). This is the end of the policy-change-request processing.

The policy-change-request processing unit in the other providers (electric power company and bank in the example of FIG. 7) performs the policy-change request processing (processing of steps A10-A13) shown in FIG. 6 based on the message from the policy-change-request processing unit 30.

The policy-change-request processing unit in the other providers (electric power company and bank in the example of FIG. 7) may have a configuration of performing the policy-change input processing (processing of steps A1-A9) shown in FIG. 5 or a configuration of performing the policy-change request (processing of steps A10-A13 and B1-B5) shown in FIG. 10. That is, the configuration may be such that the other providers transmit the policy-change request message or a deletion request of the personal information to another provider.

As described heretofore, according to the second exemplary embodiment, the configuration is such that the policy-change-request processing unit 30 in the one-stop service provider performs the judgment as to whether or not the privacy policy is to be changed, and if it is needed to change the privacy policy, the policy-change request message etc. is transmitted to the device in the other providers, Thus, the burden of performing the judgment of change of the privacy policy and performing transmission/reception of the message between the providers can be alleviated.

Third Exemplary Embodiment

In the above first and second exemplary embodiments, if the user requests change of the privacy policy, the change of privacy policy is requested to the provider (telephone company in the example of FIGS. 1 and 7) that originally issued the personal information. However, it may be considered to request the change of privacy policy to a provider (electric power company or bank in the example of FIGS. 1 and 7) other than the provider that originally issued the personal information. Thus, in the third exemplary embodiment, a configuration is proposed wherein if the user requests a change of the privacy policy to a provider other than the provider that originally issued the personal information, the request of change of the privacy policy is noticed to the provider that originally issued the personal information.

FIG. 11 is a block diagram showing the configuration of a sharing management system in the third exemplary embodiment of the present invention. As shown in FIG. 11, the sharing management system in the third exemplary embodiment includes a policy-change input unit 40 and a policy-change-request processing unit 30. The policy-change input unit 40 corresponds to a device by which the electric power company or bank (same applies to telephone company) in FIG. 7 manages the personal information and privacy policy, whereas the policy-change-request processing unit 30 corresponds to a device by which the one-stop service provider in FIG. 7 relays (transfers) the message between the providers.

As shown in FIG. 11, the policy-change-request processing unit 30 has a configuration similar to that of the policy-change-request processing unit 30 shown in FIG. 8. The policy-change input unit 40 has a configuration such that a personal-information-issuing-provider communication unit 48 is added to the configuration of the policy-change input unit 40 shown in FIGS. 2 and 8.

Description of the configuration similar to that of FIGS. 2 and 8 will be omitted here.

The personal-information-issuing-provider communication unit 48 judges whether or not the own unit is a provider that originally issued the personal information when the change request of privacy policy is received from the user, and if the unit is not the original provider, creates a policy change notice and notifies the same to the provider that originally issued the personal information.

The personal-information-issuing-provider communication unit 48 includes a policy-change-notice creation unit 481, a personal-information-issuer retrieval unit 482, and a personal-information-issuer information storage unit 483, as shown in FIG. 11.

The policy-change-notice creation unit 481 creates a policy change notice that communicates the change request of privacy policy acquired from the user to the provider that issued the personal information, if the own unit is not the provider that issued the specified user's personal information.

The personal-information-issuer retrieval unit 482 performs, upon receiving the personal information, processing of registering the information of the provider that issued the personal information (personal-information-issuer information) in the personal-information-issuer information storage unit 483. In addition, the personal-information-issuer retrieval unit 482 acquires, upon receiving the change request of privacy policy from the user, the personal-information-issuer information from the personal-information-issuer information storage unit 483, and performs processing of retrieving the provider that issued the personal information of the user that requested the change of privacy policy based on the acquired personal-information-issuer information.

The personal-information-issuer information storage unit 483 stores (memorizes, keeps) therein the personal-information-issuer information of the provider that issued the personal information. It is assumed here that the information that personally identifies the user and the information that identifies the provider are stored in the personal-information-issuer information storage unit 483 in association with each other.

Operation of the sharing management system in the third exemplary embodiment of the present invention will be described hereinafter.

It is assumed that the personal-information-issuer information is stored in the personal-information-issuer information storage unit 483 as a premise on the description of operation of the sharing management system in the third exemplary embodiment. The policy-change input unit 10 stores, upon receiving personal information from another provider, the personal information in the personal-information storage unit 112, and at the same time, stores information that identifies the user that is tabulated in association with the personal information and information that identifies the provider that issued the personal information in the personal-information-issuer information storage unit 483.

Figure 12:
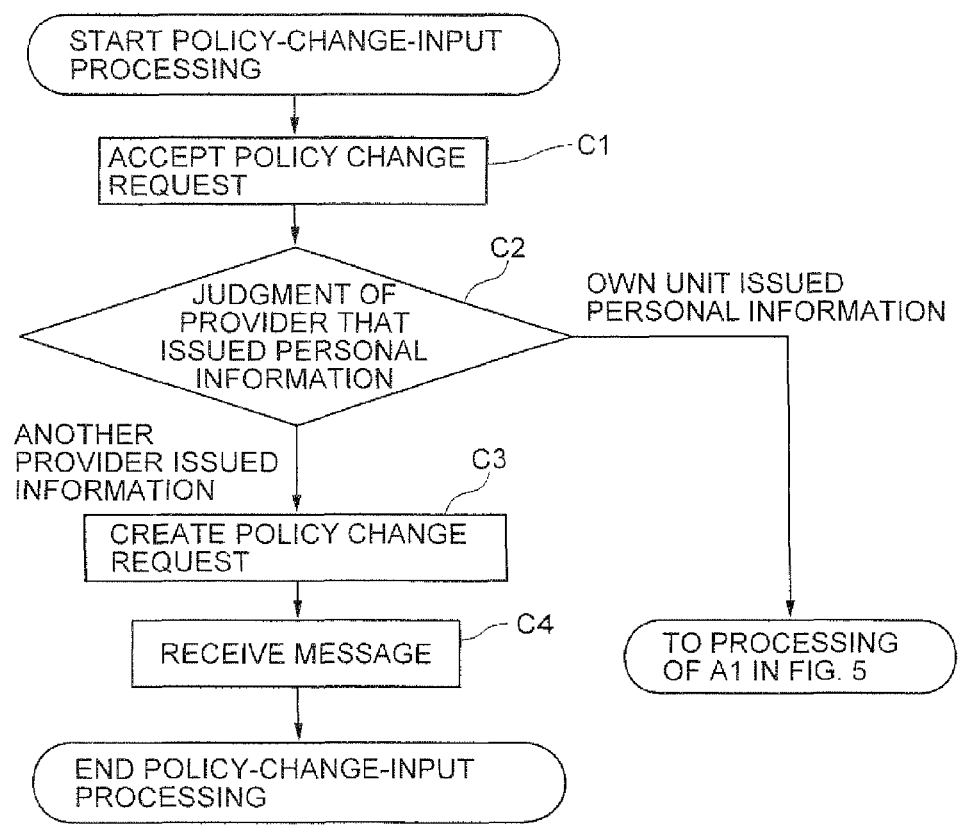
FIG. 12 is a flowchart showing an input processing of the policy change in the third exemplary embodiment of the present invention.

FIG. 12 is a flowchart showing the policy-change input processing in the third exemplary embodiment of the present invention. It is assumed here that the user transmitted, upon wishing to change the privacy policy with respect to the personal information registered in a specific provider (for example, telephone company), a change request of the privacy policy to the policy-change input unit 40 of another provider (for example, electric power company or bank) other than the specific provider via the own terminal (for example, personal computer). In this case, in the policy-change input unit 40, the input device 14 receives and accepts the change request of privacy policy transmitted from the user terminal (step C1). The change request of the privacy policy from the user terminal includes a privacy policy (updating policy) including updated contents.

Thereafter, the personal-information-issuer retrieval unit 482 acquires personal-information-issuer information from the personal-information-issuer information storage unit 483, and retrieves the provider that issued the personal information of the user that requested the change of privacy policy, based on the acquired personal-information-issuer information. Then, the personal-information-issuer retrieval unit 482 judges whether or not the own unit is the provider that originally issued the personal information (step C2).

If the provider that originally issued the personal information is the policy-change input unit 40 itself, operation in the first or second exemplary embodiment is performed. That is, the process advances to the processing of step A2 in FIG. 5.

On the other hand, if the provider that originally issued the personal information is not the policy-change input unit 40 itself, it is needed to notify the change request from the user to the provider that originally issued the personal information, without performing change processing of the privacy policy based on the change request from the user. Thus, the policy-change-notice creation unit 481 creates a change notice (policy change notice) of the privacy policy (step C3). The policy change notice includes the privacy policy changed by the user. The policy change notice also includes information showing that the address of the message is of the provider that originally issued the personal information. The policy-change-notice creation unit 481 transmits the message of the generated policy change notice to the policy-change-request processing unit (one-stop service provider) 30 via the communication unit 15.

The policy-change-request processing unit 30 transfers, upon receiving the message of the policy change notice from the policy-change input unit 40, the message to the provider that originally issued the personal information. In addition, the processing of steps A10-A13 and B1-B5 in FIG. 10 is performed. More specifically, processing of transmitting the policy-change request message or deletion request of the personal information to the other providers is performed.

The policy-change input unit 40 may be configured to directly transmit the message of the policy change notice to the provider that originally issued the personal information, without the intervening policy-change-request processing unit 30. In this case, the provider that originally issued the personal information performs the processing described in the first and second exemplary embodiments as the policy-change input unit 10.

As described heretofore, in the third exemplary embodiment, if the user requests the change of privacy policy to a provider other than the provider that originally issued the personal information, the change request is transferred to the provider that originally issued the personal information, whereby the user is allowed to transmit the change request of privacy policy to an arbitrary provider, without being conscious of the provider that issued the personal information of the user, whereby the convenience of the user is enhanced.

The above third exemplary embodiment is such that the provider to which the user requests the change of privacy policy is the bank or electric company which is other than the telephone company that originally issued the personal information; however, the configuration may be such that user requests the change of privacy policy to the one-stop service provider.

Fourth Exemplary Embodiment

Figure 13:
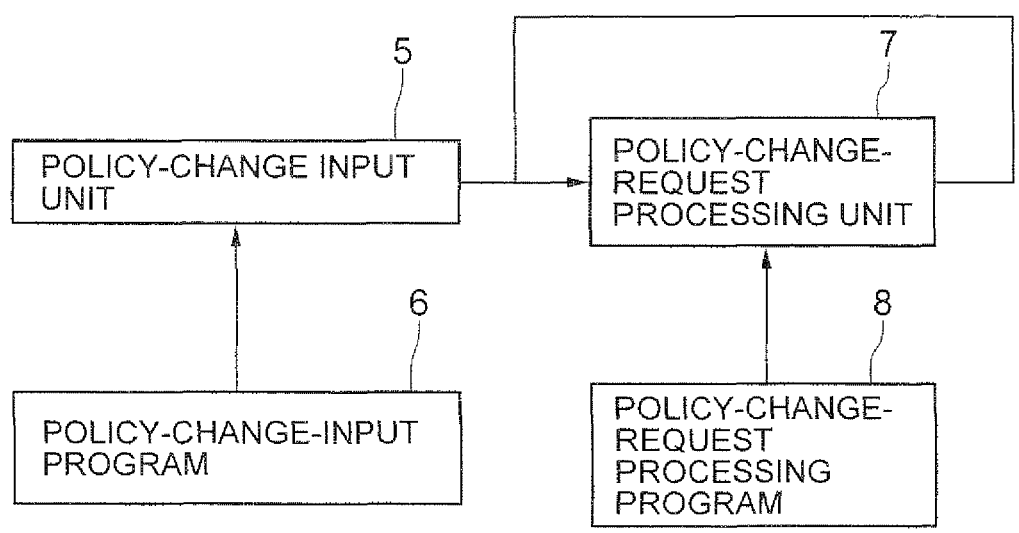
FIG. 13 is a block diagram showing the configuration of a sharing management system in a fourth exemplary embodiment of the present invention.

FIG. 13 is a block diagram showing the configuration of a sharing management system in the fourth exemplary embodiment of the present invention. As shown in FIG. 13, in the policy-change input unit in the first through third exemplary embodiments (policy-change input unit 5 in the case of FIG. 13), the constituent parts are realized by a control section, such as a CPU, that performs the processing, which is described with respect to the first through third exemplary embodiments, according to the policy-change-request processing program 8 stored in a storage unit such as a hard disc. In the policy-change input unit (policy-change input unit 5 in the case of FIG. 13), the storage units, such as the personal-information storage unit 112 and policy storage unit 122, are realized by hard disks or other storage devices.

In the policy-change input unit in the first through third exemplary embodiments (policy-change input unit 5 in the case of FIG. 13), the constituent parts are realized by a control section, such as a CPU, that performs the processing described with respect to the first through third exemplary embodiments, in accordance with the policy-change-request processing program 8 stored in a storage unit such as a hard disc. In the policy-change input unit (policy-change input unit 5 in the case of FIG. 13), the storage units, such as the personal-information storage unit 112 and policy storage unit 122, are realized by a hard disk or other storage devices.

Next, overall operation of this system will be described.
(1) A concrete example of the entire system of the present invention will be first described with reference to FIGS. 7 and 9. As shown in FIG. 7, the telephone company, electric power company bank etc. manage the user's personal information (telephone number, account number, address, name, call charge, amount of used electric power etc.). The personal information managed by those companies is transmitted and received via the one-stop service provider. It is assumed here that the personal information is already shared among the companies, whereby all the companies have the same personal information, and transmission/reception of the privacy policy is also performed among the companies among which transmission/reception of the personal information is performed.

Under the above circumstances, a user changes the privacy policy in the telephone company with respect to distribution of telephone number, whereby the change is notified to all the companies. In the example of FIG. 7, the telephone company corresponds to the policy-change input unit 10 in of FIG. 8, and the one-stop service provider corresponds to the policy-change-request processing unit 30 in FIG. 8.

An example of the privacy policies exchanged among the companies is shown in FIG. 9. It is assumed here that the privacy policy as shown in FIG. 9(A) is exchanged between the telephone company and the one-stop service provider, for example. This example shows the user and access right of the system manager, a list of allowable intended uses of the personal information, a management scheme of the personal information, and a list of companies that can jointly use the personal information. It is assumed similarly that the privacy policy shown in FIG. 9(B) and the privacy policy shown in FIG. 9(C) are exchanged between the one-stop service provider and the bank and between the one-stop service provider and the electric power company, respectively.

Under the above circumstances, a case is considered here wherein a user requests change of the privacy policy with respect to the own telephone number to the telephone company, as shown in FIG. 9(D). The telephone company, which exchanges the privacy policy as shown in FIG. 9(A) with the one-stop service provider at this stage, forwards the change notice of privacy policy. At this stage, the privacy policy shown in FIG. 9(D) is a subset (subsumption) of the privacy policy shown in (A), whereby the privacy policy shown in (D) is determined as the privacy policy, as it is, to be included in the change notice. Transmission/reception of this change notice changes the privacy policy exchanged between the one-stop service provider and the telephone company to such that shown in FIG. 9(E).

The one-stop service provider judges whether or not the change notice of privacy policy is to be transmitted to the bank and electric power company. Although the privacy policy shown in FIG. 9(B) has been managed between the one-stop service provider and the bank, this privacy policy is a subset of the privacy policy shown in FIG. 9(E). Thus, transmission/reception of the message is not performed between the one-stop service provider and the bank. On the other hand, there is no common element in the intended use between the privacy policy shown in FIG. 9(C) defined between the one-stop provider and the electric power company and the updated privacy policy such as shown in FIG. 9(E), and thus the one-stop service provider judges that the electric power company does not have the right to manage the personal information. Therefore, the one-stop service provider forwards a deletion request of the personal information to the electric power company. The electric power company deletes the telephone number and privacy policy managed by the telephone company, after receiving the deletion request.

In the example shown in FIG. 7, if the user accesses the one-stop service provider instead of the telephone company, and changes the privacy policy with respect to the telephone number, this example corresponds to the third exemplary embodiment. It is also assumed under such circumstances that the privacy policy shown in FIG. 9(A) is exchanged between the telephone company and the one-stop provider, the privacy policy shown in FIG. 9(B) is exchanged between the one-stop provider and the bank, and the privacy policy shown in FIG. 9(C) is exchanged between the one-stop provider and the electric power company.

It is assumed here that the user fed the change request of privacy policy shown in FIG. 9(D) to the one-stop service provider. It is to be noted that the provider that assigned the telephone number to the user is the telephone company, and thus the right to change and delete the privacy policy with respect to the telephone number resides in the telephone company. Accordingly, the one-stop service provider forwards the change notice of the privacy policy shown in FIG. 9(D) to the telephone company. The telephone company performs processing similar to that described in the first and second exemplary embodiments after receiving the change notice of privacy policy.

(2) Next, the order of processing and data (message) in the entire system of the present invention will be described with reference to FIG. 14. FIG. 14 is a sequential diagram for use in description of operation of the entire system of the present invention. The user 64 first feeds the change request of privacy policy to the telephone company 61. The telephone company 61 performs change processing of the privacy policy in accordance with the change request of privacy policy from the user 64. Subsequently, a policy-change request message is created and the message is transmitted to the one-stop service provider 65 as a policy change request.

The one-stop service provider 65 performs change processing of the privacy policy based on the policy-change request message. The one-stop service provider 65 judges whether or not it is needed to change the privacy policy in the other providers, and creates a policy-change request message and transmits the created message to the other providers (electric power company 62 and bank 63), if the change is needed.

The electric power company 62 performs change processing of the privacy policy based on the policy-change request message. Upon completion of the change processing of privacy policy, the electric power company 62 transmits a policy-change completion message showing that change of the privacy policy is completed to the one-stop service provider 65.

The bank 63 also performs change processing of the privacy policy based on the policy-change request message. Upon completion of the change processing of privacy policy, the bank transmits a policy-change completion message to the one-stop service provider 65.

The one-stop service provider 65 transfers the message to the telephone company 61, upon receiving the policy-change completion message from the electric power company 62 or bank 63. The telephone company 61 transfers the policy-change completion message to the terminal of user 64, upon receiving the policy-change completion message from the one-stop service provider 65. Thus, the policy-change completion message is transmitted to the telephone company 61 and user 64, whereby the telephone company and user recognize completion of the change of privacy policy in the providers that handle the personal information.

The configuration shown in each of the above embodiments is an example, and it is possible to suitably change the configuration depending on the state of operation.

For example, the privacy policy shown in FIGS. 3 and 9 is a mere example, and it is possible to specify items other than the item shown in FIGS. 3 and 9 as the privacy policy.

The configuration described is such that the privacy policy is changed in the providers that manage the personal information based on the change request of privacy policy from the user. However, the configuration may be such that if the basic principle with respect to handling of the personal information is changed in a specific provider, the privacy policy in the providers that manage the personal information is changed based on the change request of privacy policy from the specific provider. In this case either, it is possible to change the privacy policy in each provider that manages the personal information by performing processing similarly to the case wherein the change request of privacy policy is requested from the user.

In each of the above embodiments, the change is described for the case of narrowing (tightening) the condition specified by the privacy policy. It may be considered also possible to widen (alleviate) the condition specified by the privacy policy based on a request from the user or a provider. However, in this case, since it is needed to newly design the condition for handling the personal information after the agreement between the user and the provider, it is sufficient to perform processing similar to design of a new privacy policy.

As described heretofore, according to the sharing management system of the above embodiments, the privacy policy can be changed to reflect the range of user's consent to the providers that share thereamong the personal information.

The present invention may assume the following aspects.

The plurality of management units in the present invention are each realized by a change-request input unit 10, 40 or a policy-change-request processing unit 20, for example. The personal-information management unit is realized by a personal-information management section 11, 21, for example. The policy management unit is realized by a policy management section 12, 22, for example. The policy creation unit is realized by a transmission-policy creation section 13 or a transferred-policy creation section 36, for example.

The management units may be configured to include a change-request accepting unit that accepts the policy change request with respect to user's personal information from the user terminal. Here, the change request accepting unit is realized, for example, by the input device 14. According to such a configuration, the change request of the policy from the user can be assuredly received for reflection thereof.

The management unit or the relay unit may be configured to include a change-request transmission unit that transmits the policy change request to the management unit of one of the providers that first registered the personal information, upon receiving the policy change request with respect to the personal information other than the personal information that is registered first by the own provider. Here, the change-request transmission unit is realized by a personal-information-issuing-provider communication unit 48, for example. According to such a configuration, the user can request change of the policy to another unit other than the management unit that originally issued the personal information or the relay unit, and can enhance convenience of the user.

The policy creation unit may be configured to investigate an inclusive relationship between a policy with which replacement is requested and a managed policy managed by another management unit, judge that it is not needed to change the managed policy if the policy with which replacement is requested includes the managed policy, replace the managed policy with the policy with which replacement is requested if the managed policy includes the policy with which replacement is requested, judge whether or not there is a set intersection between the policy with which replacement is requested and the managed policy, and replace the managed policy with the policy with which replacement is requested if the set intersection exists. According to such a configuration, change of privacy policy can be realized within the range of user's consent.

The policy creation unit may be configured to judge whether or not there is a set intersection between the policy with which replacement is requested and the policy managed by the another management unit, and transmit a deletion request of the personal information managed by the another management unit if there is no set intersection. According to such a configuration, it is possible to assuredly prevent the personal information form being used outside the intended use etc. that the user wishes.

The management unit may be configured to execute a change-request accepting step that accepts the policy change request with respect to user's personal information from a user terminal. According to such a configuration, the change request of the policy from the user can be assuredly received and reflected.

The management unit or relay unit may be configured to execute a change-request transmission step that transmits the policy change request to the management unit of one of the providers that first registered the personal information, upon receiving the policy change request with respect to the personal information other than the personal information that is registered first by the own provider. According to such a configuration, the user can request change of the policy to another unit other than the management unit that originally issued the personal information or the relay unit, and can enhance convenience of the user.

The policy creation step may investigate an inclusive relationship between a policy with which replacement is requested and a managed policy managed by another management unit, judge that it is not needed to change the managed policy if the policy with which replacement is requested includes the managed policy, replace the managed policy with the policy with which replacement is requested if the managed policy includes the policy with which replacement is requested, judge whether or not there is a set intersection between the policy with which replacement is requested and the managed policy, and replace the managed policy with the policy with which replacement is requested if the set intersection exists. According to such a configuration, change of the privacy policy can be performed within the range of user's consent for reflecting the same.

The policy creation step may judge whether or not there is a set intersection between the policy with which replacement is requested and the managed policy, and transmit a deletion request of the personal information managed by the another management unit if there is no set intersection, and the personal-information-management step may delete the stored personal information in response to the deletion request of the personal information. According to such a configuration, it is possible to assuredly prevent the personal information from be used outside the intended use that the user wishes.

The management unit may be caused to execute a change-request accepting processing that accepts the policy change request with respect to user's personal information from a user terminal. According to such a configuration, the change request of the policy from the user can be assuredly received for reflection thereof.

The management units or relay unit may be caused to execute a change-request transmission processing that transmits the policy change request to the management unit of one of the providers that first registered the personal information upon receiving the policy change request with respect to the personal information other than the personal information that was registered first by the own provider. According to such a configuration, the user can request change of the policy to another unit other than the management unit that originally issued the personal information or the relay unit, and can enhance convenience of the user.

The policy creation processing may investigate an inclusive relationship between a policy with which replacement is requested and a managed policy managed by another management unit, judge that it is not needed to change the managed policy if the policy with which replacement is requested includes the managed policy, replace the managed policy with the policy with which replacement is requested if the managed policy includes the policy with which replacement is requested, judge whether or not there is a set intersection between the policy with which replacement is requested and the managed policy, and replace the managed policy with the policy with which replacement is requested if the set intersection exists. According to such a configuration, change of privacy policy can be realized within the range of user's consent.

The policy creation processing may judge whether or not there is a set intersection between the policy with which replacement is requested and the managed policy, and transmit a deletion request of the personal information managed by another management unit if there is no set intersection, and the personal-information-management processing may delete the stored personal information in response to the deletion request of the personal information. According to such a configuration, it is possible to assuredly prevent the personal information form being used outside the intended use etc. that the user wishes.

While the invention has been described with reference to preferred embodiments thereof, the invention is not limited to the configuration of the above embodiment, and various changes and alterations from the above embodiments may fall within the scope of the present invention.

INDUSTRIAL APPLICABILITY

The present invention is applicable to a service providing unit in a provider that provides a service which requires personal information, and to use of a program that causes a computer in a service providing system to execute the processing thereof. The present invention is also applicable to use of a one-stop service that is shared among various organizations.

This application is based upon and claims the benefit of priority from Japanese patent application No. 2006-172254 filed on, Jun. 22, 2006, the disclosure of which is incorporated herein in its entirety by reference.

The invention claimed is:

1. A personal information management device that communicates with another personal information management device, comprising:
  a personal information storage device that stores a first policy with respect to handling of personal information, the first policy including information indicating shared personal information and a condition in which the shared personal information can be used, for each of shared users of the personal information management device and the another personal information management device;
  a third policy storage device that communicates with the another personal information management device that stores the personal information including the shared personal information and a second policy indicating a condition in which the shared personal information can be used for each of the shared users and provides services using the personal information by executing the second policy, the third policy storage device communicating a third policy indicating a condition in which the shared personal information can be used and storing the communicated third policy;
  a change request reception device that receives a change request that requests to change, with respect to a policy corresponding to one of the shared users, a condition in which the shared personal information of the one of the shared users can be used;
  a policy update device that updates, in response to the change request received by the change request reception device, the first policy stored in said personal information storage device based on the change request to obtain a new policy of the shared user related to the change request; and
  a policy transmission device that compares the new policy with the third policy of the shared user related to the change request stored in the third policy storage device, determines whether or not there is a first condition in which shared personal information of the shared user related to the change request cannot be used in the new policy but can be used in the second policy being executed by the another personal-information-management device, that creates, when there is the first condition, a policy change request including a request to change a first policy so that the shared personal information cannot be used under the first condition, and that transmits the policy change request to said another personal information management device.

2. The personal information management device according to claim 1, wherein said policy transmission device determines whether or not there is a specific condition in which the shared personal information of the shared user related to the change request can be used in the new policy but cannot be used in the second policy being executed by the another personal information management device, and transfers the received change request to the another personal information management device that executes the second policy in which the shared personal information cannot be used in said specific condition, upon determining that there is said second condition.

3. The personal information management device according to claim 1, wherein:
said policy transmission device determines whether or not there is a common condition in which the shared personal information of the shared user related to the change request can be used in the new policy and the second policy being executed by the another personal-information management device by means of the comparison, and transmits, upon determining that there is no common condition, a request to delete all the shared personal information of the shared user related to the change request.

4. The personal information management device according to claim 3, wherein said policy update device deletes, upon receiving said request to delete all the shared personal information of the shared user, all the stored shared personal information of the shared user.

5. A personal information management method comprising the steps of:
storing in a storage device a first policy with respect to handling of personal information, the first policy including information indicating shared personal information and a condition, in which the shared personal information can be used, for each of shared users of a personal information management device and another personal information management device, the first policy being executed by the personal information management device;
communicating, with the another personal information management device that stores personal information including the shared personal information and a second policy indicating a condition, in which the shared personal information can be used, for each of the shared users and provides services using the personal information by executing the second policy, a third policy indicating a condition in which the shared personal information can be used, and storing the communicated third policy in the storage device;
receiving a change request that requests to change, with respect to a policy corresponding to one of the shared users, a condition in which the shared personal information of the one of the shared users can be used;
updating, in response to the received change request, the first policy to be changed executed by the personal information management device and stored in the storage device, based on the change request to obtain a new policy of the shared user related to the change request;
comparing the new policy with the third policy stored in the storage device, and determining whether or not there is a first condition in which the shared personal information of the shared user related to the change request cannot be used in the new policy but can be used in the second policy being executed by the another personal information management device;
creating, when there is a first condition, a policy change request including a request to change a first policy so that the shared personal information of the shared user related to the change request cannot be used under the first condition; and
transmitting said policy change request to said another personal information management device.

6. The personal information management method according to claim 5, further comprising:
determining whether there is a specific condition in which the shared personal information of the shared user related to the change request can be used in the new policy but cannot be used in the second policy being executed by the another personal information management device; and
transferring the received change request to the another personal information management device that executes the second policy in which the shared personal information cannot be used in said specific condition, upon determining that there is said second condition.

7. The personal information management method according to claim 6, further comprising:
determining whether there is a common condition in which the shared personal information of the shared user related to the change request can be used in the new policy and the second policy being executed by the another personal information management device by means of the comparison; and
transmitting, upon determining that there is no common condition, a request to delete all the shared personal information of the shared user related to the change request.

8. The personal information management method according to claim 7, further comprising deleting, upon receiving said request to delete all the shared personal information of the shared user, all the stored shared personal information of the shared user.

9. A non-transient computer-readable medium encoded with a computer program for causing a computer that is able to communicate with an external personal information management device to share and manage personal information of a shared user, said program defining the processes of:
storing in a storage unit a first policy with respect to handling of personal information, the first policy including information indicating shared personal information and a condition, in which the shared personal information can be used, for each of the shared users, the first policy being executed by the computer;
communicating, with the external personal information management device that stores personal information including the shared personal information and a second policy indicating a condition, in which the shared personal information can be used, for each of the shared users and provides services using the personal information by executing the second policy, a third policy indicating a condition in which the shared personal information can be used, and storing the communicated third policy in the storage unit;
receiving a change request that requests to change, with respect to a policy corresponding to one of the shared users, a condition in which the shared personal information of the one of the shared users can be used;
updating, in response to the received change request, the first policy to be changed executed by the computer and stored in the storage unit, based on the change request to obtain a new policy of the shared user related to the change request;
comparing the new policy with the third policy stored in the storage unit, and determining whether or not there is a first condition in which the shared personal information of the shared user related to the change request cannot be used in the new policy but can be used in the second policy being executed by the external personal information management device;

creating, when there is a first condition, a policy change request including a request to change a first policy so that the shared personal information of the shared user related to the change request cannot be used under the first condition; and transmitting said policy change request to said external personal information management device.

10. The computer-readable medium according to claim 9, said computer program further defining the processes of:

determining whether or not there is a specific condition in which the shared personal information of the shared user related to the change request can be used in the new policy but cannot be used in the second policy being executed by the external personal-information management device; and transferring the received change request to the external personal information management device that executes the second policy in which the shared personal information cannot be used in the specific condition upon determining that there is said second condition.

11. The computer-readable medium according to claim 9, said computer program further defining the processes of:

determining whether or not there is a common condition in which shared personal information of the shared user related to the change request can be used in the new policy and the second policy being executed by the external personal information management device by means of the comparison; and transmitting, upon determining that there is no common condition, a request to delete all the shared personal information of the shared user related to the change request.

12. The computer-readable medium according to claim 9, said computer program further defining the processes of:

deleting, upon receiving said request to delete all the shared personal information of the shared user, all the stored shared personal information of the shared user.

\* \* \* \* \*